US012745204B2

(12) United States Patent
Manolakos et al.

(10) Patent No.: US 12,745,204 B2
(45) Date of Patent: Sep. 22, 2026

(54) RESOURCE SET PROCESSING PRIORITIZATION DETERMINATION BASED ON RESOURCE INDEX INFORMATION

(71) Applicant: QUALCOMM Incorporated, San Diego, CA (US)

(72) Inventors: Alexandros Manolakos, Escondido, CA (US); Mukesh Kumar, Hyderabad (IN); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 469 days.

(21) Appl. No.: 18/546,250

(22) PCT Filed: Mar. 14, 2022

(86) PCT No.: PCT/US2022/020176
§ 371 (c)(1),
(2) Date: Aug. 11, 2023

(87) PCT Pub. No.: WO2022/220970
PCT Pub. Date: Oct. 20, 2022

(65) Prior Publication Data

US 2024/0129883 A1 Apr. 18, 2024

(30) Foreign Application Priority Data

Apr. 12, 2021 (IN) ............................. 202121017037

(51) Int. Cl.
*H04W 64/00* (2009.01)
*H04B 17/318* (2015.01)
(Continued)

(52) U.S. Cl.
CPC .......... *H04W 64/00* (2013.01); *H04B 17/328* (2023.05); *H04L 5/0051* (2013.01); *H04W 16/28* (2013.01)

(58) Field of Classification Search
CPC .... H04W 64/00; H04W 16/28; H04B 17/328; H04L 5/0051
See application file for complete search history.

(56) References Cited

U.S. PATENT DOCUMENTS 7,893,873 B2 2/2011 Black et al.
10,736,074 B2 8/2020 Edge et al.
(Continued)

FOREIGN PATENT DOCUMENTS

JP 2022523137 A 4/2022
JP 2022528838 A 6/2022
(Continued)

OTHER PUBLICATIONS

Taiwan Search Report—TW111109491—TIPO—Jul. 10, 2025.
(Continued)

*Primary Examiner* — Fahmida S Chowdhury
(74) *Attorney, Agent, or Firm* — Polsinelli LLP

(57) ABSTRACT

Disclosed are systems, apparatuses, methods, and non-transitory media for facilitating positioning reference signal (PRS) prioritization by receiving beam index information associated with a PRS beam set. In some aspects, an assigned beam can be determined based on the beam index information. At least one adjacent beam can further be determined to be based on the assigned beam associated with the beam index information. A location measurement can also be determined based on at least one of the assigned beam, or the at least one adjacent beam.

64 Claims, 13 Drawing Sheets

(51) Int. Cl.
*H04L 5/00* (2006.01)
*H04W 16/28* (2009.01)

(56) References Cited

U.S. PATENT DOCUMENTS

| | | | | |
|---|---|---|---|---|
| 11,187,773 | B2 * | 11/2021 | Rydén | G01S 5/0236 |
| 2018/0324738 | A1 | 11/2018 | Stirling-Gallacher et al. | |
| 2019/0364535 | A1 | 11/2019 | Sadiq et al. | |
| 2020/0025853 | A1 * | 1/2020 | Sadiq | H04L 27/2613 |
| 2020/0351813 | A1 | 11/2020 | Manolakos et al. | |
| 2020/0367193 | A1 * | 11/2020 | Cha | H04W 48/12 |
| 2021/0051442 | A1 * | 2/2021 | Manolakos | G01S 1/0428 |
| 2022/0086794 | A1 * | 3/2022 | Lee | G01S 5/10 |
| 2022/0095265 | A1 * | 3/2022 | Cha | H04W 64/006 |
| 2022/0173857 | A1 * | 6/2022 | Michalopoulos | H04B 17/327 |
| 2022/0209927 | A1 * | 6/2022 | Shreevastav | H04L 5/0051 |
| 2022/0231809 | A1 * | 7/2022 | Cha | H04L 5/0048 |
| 2022/0264491 | A1 * | 8/2022 | Cha | H04L 5/0051 |
| 2022/0272731 | A1 * | 8/2022 | Cha | H04W 76/28 |
| 2022/0345194 | A1 * | 10/2022 | Karjalainen | H04L 5/006 |
| 2022/0386268 | A1 * | 12/2022 | Priyanto | G01S 5/0236 |
| 2023/0050447 | A1 * | 2/2023 | Ren | H04L 5/0094 |
| 2023/0188288 | A1 * | 6/2023 | Lee | H04L 5/0023 370/329 |
| 2023/0209495 | A1 * | 6/2023 | Michalopoulos | H04W 52/0254 455/456.2 |
| 2023/0362879 | A1 * | 11/2023 | Zhuang | H04L 27/261 |
| 2023/0370228 | A1 * | 11/2023 | Kim | H04L 5/0051 |
| 2024/0129883 | A1 * | 4/2024 | Manolakos | H04L 5/0073 |

FOREIGN PATENT DOCUMENTS

| | | | | |
|---|---|---|---|---|
| JP | 2022541463 A | 9/2022 | | |
| WO | 2007120326 | 10/2007 | | |
| WO | 2019027595 | 2/2019 | | |
| WO | 2020156567 A1 | 8/2020 | | |
| WO | WO-2020177521 A1 * | 9/2020 | | H04L 5/0053 |
| WO | 2020193853 A1 | 10/2020 | | |
| WO | 2021008581 A1 | 1/2021 | | |

OTHER PUBLICATIONS

International Search Report and Written Opinion—PCT/US2022/020176—ISA/EPO—Jun. 23, 2022.

Qualcomm Incorporated: "Potential Enhancements on DL-AoD Positioning", 3GPP TSG RAN WG1 #104b-e, R1-2103172, e-Meeting, Apr. 12, 2021-Apr. 20, 2021, Apr. 7, 2021, pp. 1-12.

VIVO: "Discussion on Potential Positioning Enhancements", 3GPP TSG RAN WG1 #101, R1-2003429, 3rd Generation Partnership Project, Mobile Competence Centre, 650, Route Des Lucioles, F-06921 Sophia-Antipolis Cedex, France, vol. RAN WG1. No. e-Meeting, May 25, 2020-Jun. 5, 2020, May 16, 2020, XP051885215, 13 Pages.

VIVO: "Discussion on Potential Positioning Enhancements", 3GPP TSG RAN WG1 #103-e, R1-2007666, e-Meeting, Oct. 26, 2020-Nov. 13, 2020, Nov. 1, 2020, 49 pages.

XIAOMI: "Potential Positioning Enhancements", 3GPP TSG RAN WG1 #103-e, R1-2008083, e-Meeting, Oct. 26, 2020-Nov. 13, 2020, Nov. 1, 2020, 5 pages.

Ericsson: "Potential Positioning Enhancements", 3GPP TSG-RAN WG1 Meeting #102-e, R1-2006916, e-Meeting, Aug. 17-28, 2020, Aug. 7, 2020, 33 Pages, Section 2.2.1.

Huawei, et al., "Enhancement for DL AoD positioning", 3GPP TSG RAN WG1 Meeting #104bis-e, R1-2103401, E-meeting, Apr. 12-Apr. 20, 2021, Apr. 7, 2021, 6 Pages, Section 2,3, Figures 1,2.

LG Electronics: "Discussion on accuracy improvements for DL-AoD positioning", 3GPP TSG RAN WG1 #104b-e, R1-2103623, e-Meeting, Apr. 12-Apr. 20, 2021, Apr. 7, 2021, 5 Pages, Section 2.3.

Sony: "Discussion on Accuracy Improvements for DL-AoD Positioning Method", 3GPP TSG RAN WG1 #104-e, R1-2100864, e-Meeting, Jan. 25-Feb. 5, 2021, Jan. 19, 2021, 3 Pages, Section 2.1.

Vivo: "Discussion on potential enhancements for DL-AoD method", 3GPP TSG RAN WG1 #104b-e, R1-2102528, e-Meeting, Apr. 12-Apr. 20, 2021, Apr. 6, 2021, 14 Pages, Section 2.1, 3.2, 5, figure 8.

* cited by examiner

900

RECEIVE A PRS BEAM SET ASSOCIATED WITH A PLURALITY OF BEAMS
902

DETERMINE AN ADJACENCY OF THE PLURALITY OF BEAMS ASSOCIATED WITH THE PRS BEAM SET BASED ON A PREDETERMINED ADJACENCY RULE
904

RESOURCE SET PROCESSING PRIORITIZATION DETERMINATION BASED ON RESOURCE INDEX INFORMATION

CROSS-REFERENCE TO RELATED APPLICATION

This application is a national stage application, filed under 35 U.S.C. § 371, of International Patent Application No. PCT/US2022/020176, filed on Mar. 14, 2022, which claims the benefit of India Provisional Patent Application No. 202121017037, filed Apr. 12, 2021, each of which are incorporated by reference herein in its entirety.

FIELD

Aspects of the disclosure relate generally to wireless positioning and the like. In some aspects, examples are described for improving downlink (DL) positioning reference signal (PRS) prioritization by utilizing PRS resource index information.

BACKGROUND

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users with, for example, a gigabit connection speeds to tens of users in a common location, such as on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods, and computer-readable media for improving downlink (DL) positioning reference signal (PRS) prioritization by utilizing PRS resource index information. According to at least one example, an apparatus for facilitating positioning reference signal (PRS) prioritization is provided, the apparatus including at least one receiver, at least one memory, and at least one processor coupled to the at least one receiver and the at least one memory and configured to: receive, via the at least one receiver, beam index information associated with a PRS beam set; determine an assigned beam, at least one adjacent beam or both based on the beam index information; and determine one or more location measurements based on the assigned beam, the at least one adjacent beam or both.

In another example, a computer-implemented method is provided for facilitating positioning reference signal (PRS) prioritization. The computer-implemented method can include: receiving, at a user equipment, beam index information associated with a PRS beam set; determining, by the user equipment, an assigned beam, at least one adjacent beam or both based on the beam index information; and determining, by the user equipment, one or more location measurements based on the assigned beam, the at least one adjacent beam or both.

In another example, an apparatus for facilitating positioning reference signal (PRS) prioritization is provided. The apparatus can include: means for receiving beam index information associated with a PRS beam set; means for determining an assigned beam, at least one adjacent beam or both based on the beam index information; and means for determining one or more location measurements based on at least one of the assigned beam, the at least one adjacent beam or both.

In another example, a non-transitory computer-readable medium is provided, comprising at least one instruction for causing a computer or processor to: receive beam index information associated with a positioning reference signal (PRS) beam set; determine an assigned beam, at least one adjacent beam or both based on the beam index information; and determine one or more location measurements based on the assigned beam, the at least one adjacent beam or both.

In some aspects, the apparatus is or is part of a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a vehicle, a server computer, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

This summary is not intended to identify key or essential features of the claimed subject matter, nor is it intended for use in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
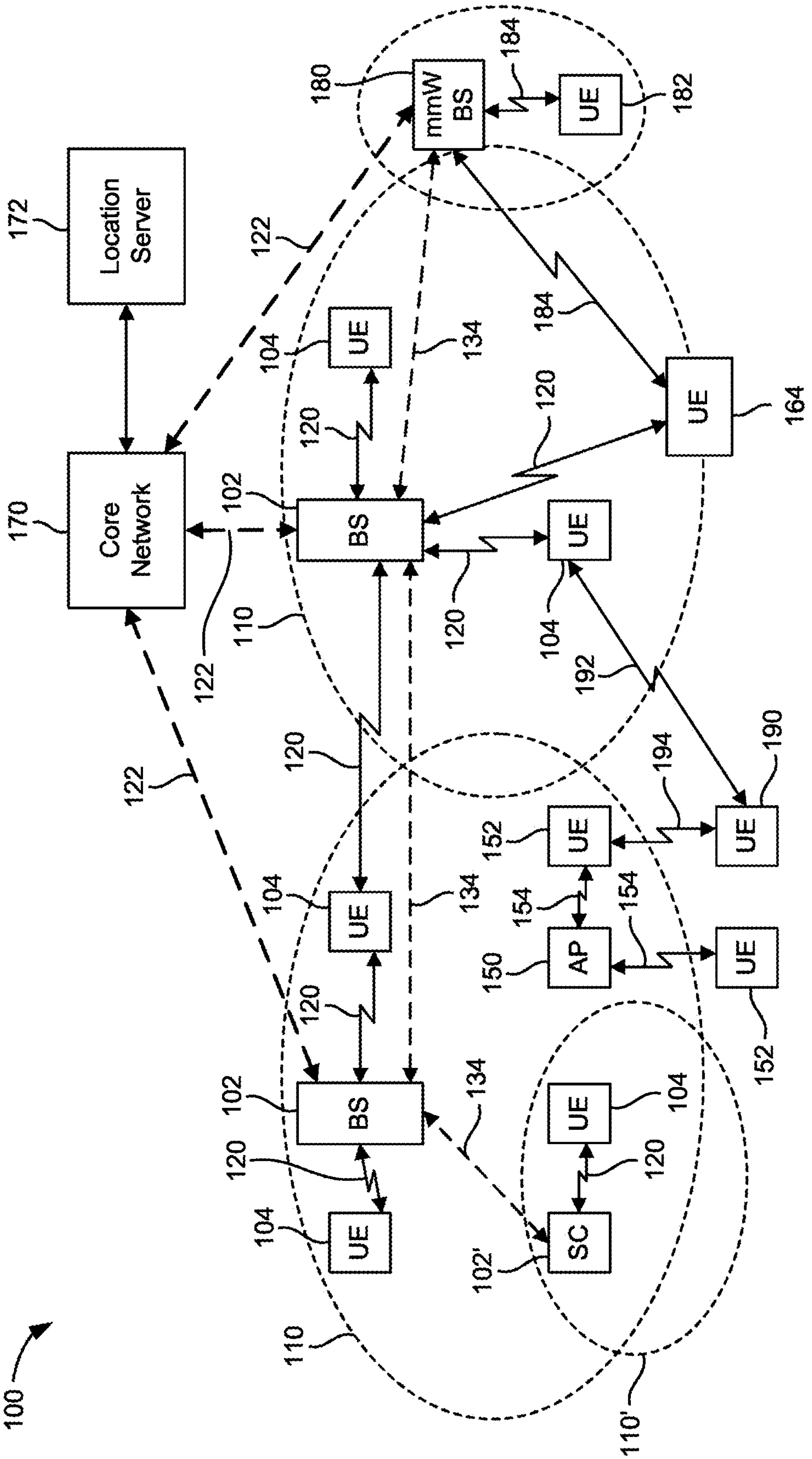
FIG. 1 is a diagram illustrating an example wireless communications system, in accordance with some aspects of the present disclosure.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein can be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Aspects of the present disclosure relate to features for improving mobile device, e.g., user equipment (UE), location estimation. As used herein, a location estimate may be referred to by other names, such as a position estimate, location, position, position fix, fix, or the like. A location estimate may be geodetic and may comprise coordinates (e.g., latitude, longitude, and possibly altitude) or may be civic and comprise a street address, postal address, or some other description of a location. A location estimate may further be defined relative to some other known location or defined in absolute terms (e.g., using latitude, longitude, and/or altitude). A location estimate may include an expected error or uncertainty (e.g., by including an area or volume within which the location is expected to be included with some specified or default level of confidence).

Systems, apparatuses, processes (also referred to as methods), and computer-readable media (collectively referred to herein as systems and techniques) are described herein for improved mobile device (e.g., UE or UE device) positioning that is achieved by utilizing adjacent beams associated with a positioning reference signal (PRS) resource set, for example, between a UE and a location management function (LMF). As described in further detail below, the systems and techniques can include receiving a PRS beam set (including a plurality of beams including PRS resources making up a PRS resource set) and processing a subset of PRS resources from the PRS beam set based on adjacent beams associated with the PRS beam set. In some examples, a plurality of beams associated with the PRS beam set can be sequentially ordered by adjacency in an angular domain (e.g., with adjacent beams having the closest downlink angle-of-departure (DL-AOD) angles out of the beams from the PRS beam set).

In some aspects, a UE device can be configured to determine adjacent beams associated with a PRS beam set. For example, the UE device can receive beam index information associated with a PRS beam set. In some aspects, the beam index information can be generated (e.g., by a location server, a UE, a gNB or other device) based on at least one of a transmission reception point (TRP) location, an antenna array panel location, an estimated location of the UE device, or a combination thereof. In some aspects, the beam index information can be received from a base station or a location server. In some implementations, a PRS resource set can be associated with the PRS beam set, which includes a plurality of beams (e.g., PRS resource of the PRS resource set can be transmitted using a beam of the plurality of beams of the PRS beam set). The beam index information can identify an assigned beam from the plurality of beams from which the UE can start processing a PRS resource. The UE device can determine an adjacency or ordering of the plurality of beams (e.g., which beams are next to one another). In one example, the plurality of beams associated with the PRS resource set can be ordered according to angular proximity/adjacency. In another example, the adjacency between the beams can be defined (e.g., an information element (IE)) in assistance data (AD). Using the determined adjacency and a priority order (e.g., defined by an adjacency beam rule) of the various beams associated with the PRS resource set, the UE device can determine which PRS resources to process (and in which order) after processing the assigned beam identified by the beam index information. For example, as described herein, the capability of a UE may be limited to processing a certain number of PRS resources (e.g., five PRS resources). In such an example, the UE may receive more PRS resources (e.g., 20 PRS resources, 64 PRS resources, etc.) than it is capable of processing. The UE can select the number of PRS resources it is capable of processing (e.g., five PRS resources) out of the total number of received PRS resources to process based on the determined adjacency and the adjacency beam rule defining the priority order.

As noted above, the UE device can determine or identify an assigned beam at least one adjacent beam or both based on the beam index information. The UE device can further determine or identify at least one adjacent beam based on the assigned beam associated with the beam index information. In some aspects, the at least one adjacent beam can be further determined based on a predetermined adjacency beam rule stored at the UE device. In some aspects, the at least one adjacent beam can be determined based on a adjacency beam rule that is received from a location server. In some implementations, the at least one adjacent beam can be determined based on a predetermined adjacency beam rule that is received from a base station. In one example, the at least one adjacent beam can be adjacent to the assigned beam in an angular domain (e.g., with adjacent beams having the closest DL-AOD angles out of the beams from the PRS beam set).

Moreover, the UE device can determine a position measurement based on at least one of the assigned beam, the at least one adjacent beam, or a combination thereof. In some examples, the position measurement can include at least one of a downlink angle of departure, a PRS-based reference signal received power (RSRP) measurement, or a combination thereof.

Additional aspects of the present disclosure are described in more detail below.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A base station may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

A radio frequency signal or "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) can include various base stations 102 and various UEs 104. The base stations 102 can include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receiving beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain of other beams available to the receiver. This results in a stronger received signal strength, (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/

182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 is equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2A:
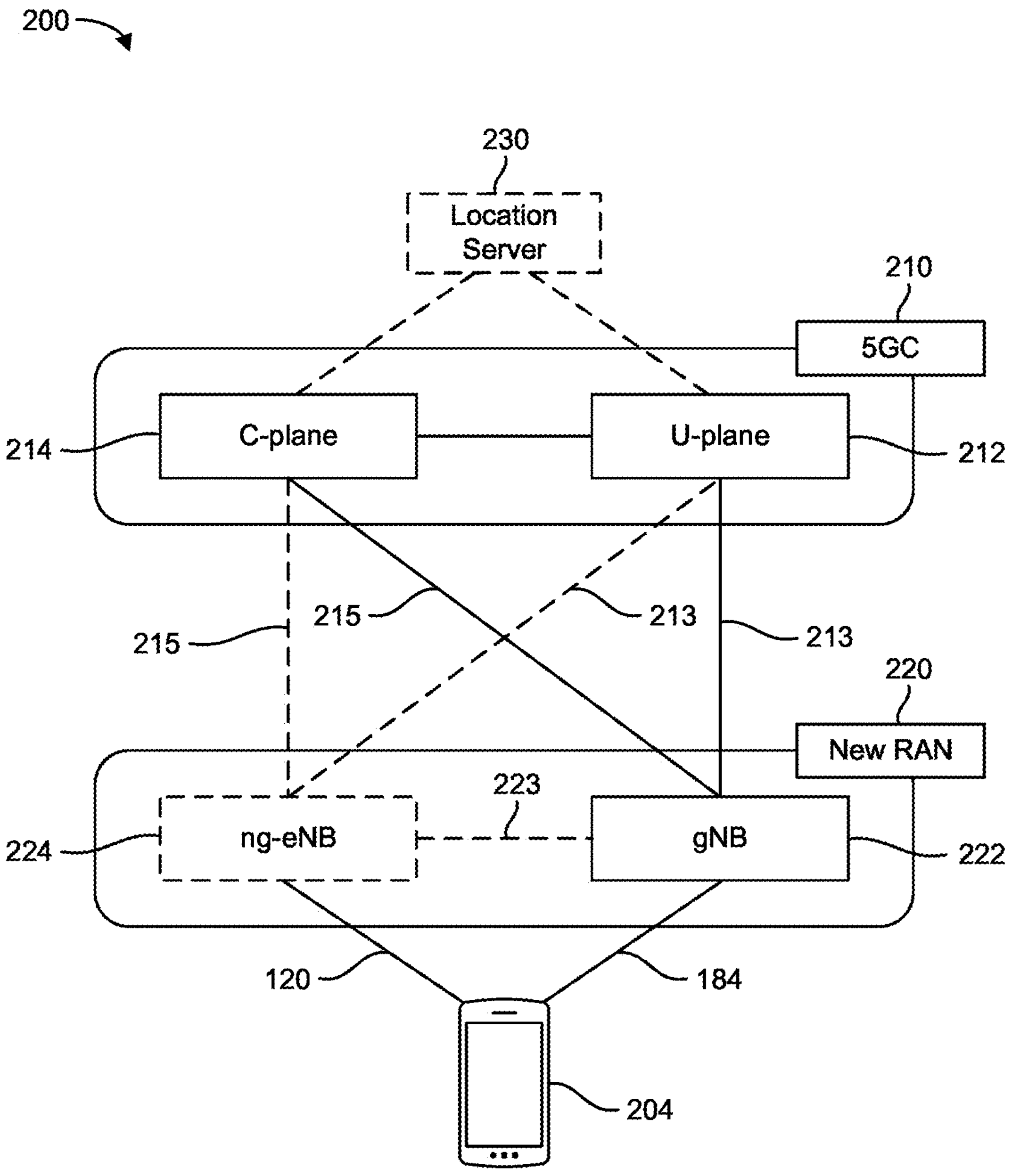
FIGS. 2A and 2B are diagrams illustrating example wireless network structures, in accordance with some aspects of the present disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1).

Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated with a component of the core network, or alternatively may be external to the core network. In some examples, the location server 230 can be operated by a carrier or provider of the 5GC 210, a third party, an original equipment manufacturer (OEM), or other party. In some cases, multiple location servers can be provided, such as a location server for the carrier, a location server for an OEM of a particular device, and/or other location servers. In such cases, location assistance data can be received from the location server of the carrier and other assistance data can be received from the location server of the OEM.

Figure 2B:
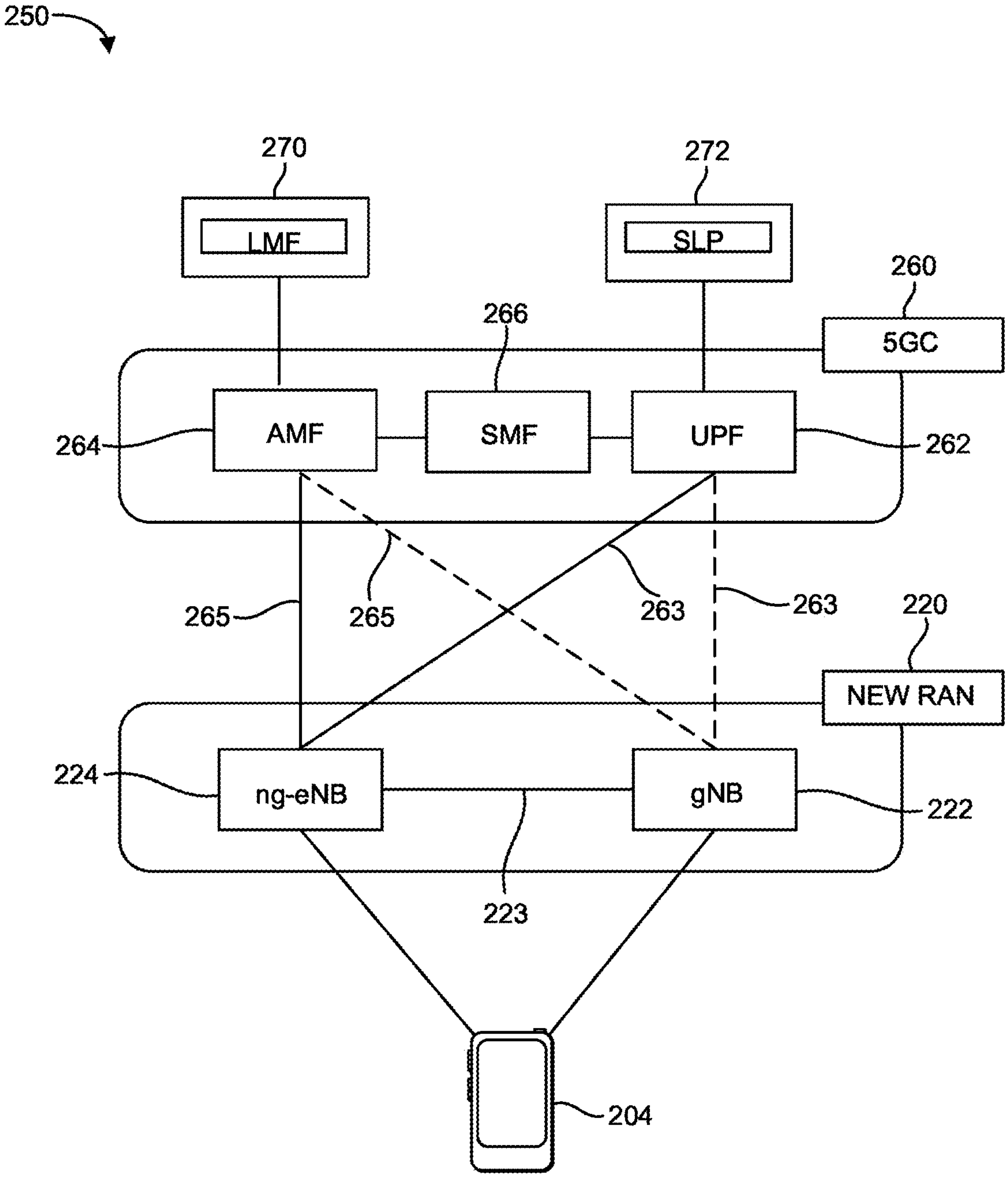

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and/or security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink and/or downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

In some aspects, location and positioning functions can be aided by a Location Management Function (LMF) 270 that is configured for communication with the 5GC 260, e.g., to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated with a base station, such as the gNB 222 and/or the ng-eNB 224. When integrated with the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

As discussed herein, NR supports a number of cellular network-based positioning technologies, including downlink-based, uplink-based, and downlink-and-uplink-based positioning methods. For example, the LMF 270 can enable positioning based on location measurements computed for various positioning signal (PRS or SRS) resources. As used herein, "PRS resource set" is a set of PRS resources used for the transmission of PRS signals, where each PRS resource has a PRS resource identifier (ID). In addition, the PRS resources in a PRS resource set are associated with the same TRP. A PRS resource set is identified by a PRS resource set ID and is associated with a particular TRP (e.g., identified by a TRP ID). In addition, the PRS resources in a PRS resource set have the same periodicity, a common muting pattern configuration, and the same repetition factor (e.g., PRS-ResourceRepetitionFactor) across slots. The periodicity is the time from the first repetition of the first PRS resource of a first PRS instance to the same first repetition of the same first PRS resource of the next PRS instance. The periodicity may have a length selected from $2^{\mu}\cdot\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

In some cases, a PRS resource ID in a PRS resource set is associated with a single beam (and/or beam ID) transmitted from a single TRP (where a TRP may transmit one or more beams). For example, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance," a "positioning occasion," "a positioning instance," a "positioning repetition," or simply an "occasion," an "instance," or a "repetition."

A "positioning frequency layer" (also referred to simply as a "frequency layer" or "layer") is a collection of one or more PRS resource sets across one or more TRPs that have the same values for certain parameters. Specifically, the collection of PRS resource sets has the same subcarrier spacing (SCS) and cyclic prefix (CP) type (meaning all numerologies supported for the PDSCH are also supported for PRS), the same Point A, the same value of the downlink PRS bandwidth, the same start PRB (and center frequency), and the same comb size. The Point A parameter takes the value of the parameter ARFCN-ValueNR (where "ARFCN" stands for "absolute radio-frequency channel number") and is an identifier and/or code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Downlink-based location measurements can include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, NRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., LMF 270) can estimate the UE's location. For DL-AoD positioning, a base station (gNB 222) measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT or multi RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be determined (e.g., using multilateration) based on the known locations of the base stations. RTT and multi-RTT methods can be combined with other positioning techniques, such as UL-AoA and DL-AoD, to improve location accuracy.

To assist positioning operations, a location server (e.g., location server 230, LMF 270, or other location server) may provide assistance data to the UE. For example, the assistance data may include identifiers of the base stations (or the cells and/or TRPs of the base stations) from which to measure reference signals, the reference signal configuration parameters (e.g., the number of consecutive positioning subframes, periodicity of positioning subframes, muting sequence, frequency hopping sequence, reference signal identifier (ID), reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

For DL-AoD, the UE 204 can provide DL-PRS beam Received Signal Received Power (RSRP) measurements to the LMF 270, whereas the gNB 222 can provide the beam azimuth and elevation angle information. When using an UL AoA positioning method, the position of UE 204 is estimated based on UL SRS AoA measurements taken at different TRPs (not illustrated). For example, TRPs can report AoA measurements directly to LMF 270. Using angle information (e.g., AoD or AoA) together TRP co-coordinate information and beam configuration details, the LMF 270 can estimate a location of UE 204.

For multi-RTT location measurements, the LMF 270 can initiate a procedure whereby multiple TRPs (not illustrated) and a UE perform the gNB Rx-Tx and UE Rx-Tx measurements, respectively. For example, the gNB 222 and UE 204 can transmit a downlink positioning reference signal (DL-PRS) and uplink sounding reference signal (UL-SRS), respectively, whereby the gNB 222 configures UL-SRS to the UE 204 e.g., using the radio resource control (RRC) protocol. In turn, the LMF 270 can provide the DL-PRS configuration to the UE 204. Resulting location measurements are reported to the LMF 270 by the UE 204 and/or gNB 222 to perform location estimation for the UE 204.

Figure 3:
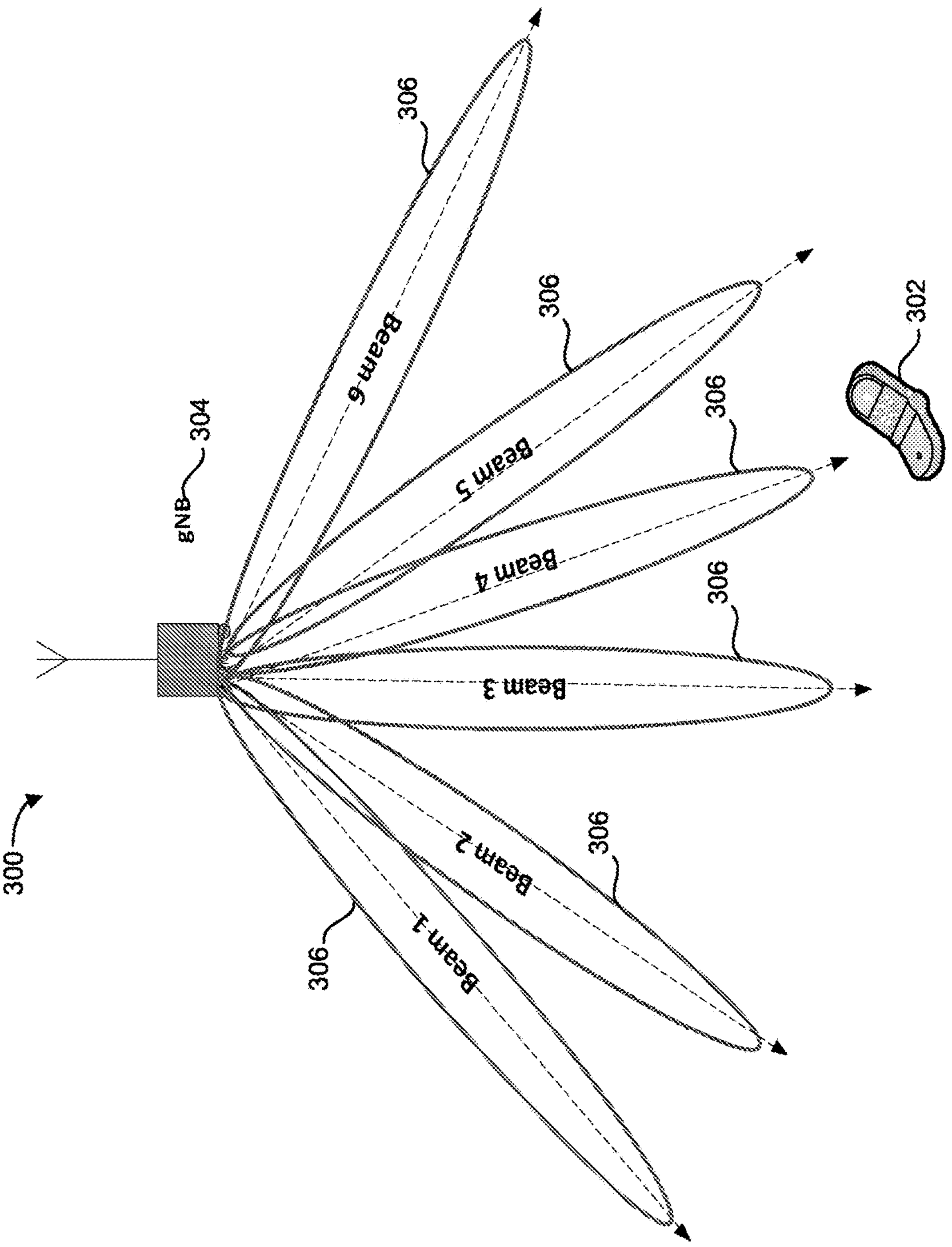
FIG. 3 illustrates an example communication diagram between a next generation Node ("gNB") and a user equipment (UE), according to some aspects of the present disclosure.

To improve the accuracy of UE location estimates, NR can support the combination of multiple different location measurement types. As illustrated in FIG. 3, a UE device 302 can determine its capability to process a PRS resource 306 (e.g., measure location or position data) in a PRS system 300. The UE device 302 can then provide its capabilities to a base station 304 (shown as a gNB) or location server (e.g., LMF, not illustrated) in a capability update that can be used to determine which PRS resources are to be utilized for performing location or position measurements (e.g., to determine a location of the UE device 302). Thereafter, the UE device 302 can receive assistance data (AD) from the base station 304 or location server, and perform PRS measurements based on the assistance data. However, in some cases the amount of assistance data (e.g., the number of PRS resources indicated by the assistance data) can be significantly greater than the capabilities of the UE device 302.

For example, the UE device 302 may only be capable of processing 5 PRS resources, yet the PRS assistance data may provide 20 PRS resources to the UE device 302. In this example, the UE device 302 may select a subset of PRS resources, such as 5 PRS resources, out of the 20 PRS resources with which to perform location or position measurements. In some cases, the UE may select the PRS resources based on a default order corresponding with the manner in which the resources are provided by the assistance data. For example, the UE can operate in a manner that assumes that the PRS resources are provided (e.g., in the AD) in a decreasing order of measurement priority. By way of example, within a positioning frequency layer, the DL PRS resources can be sorted in the AD in a decreasing priority order of measurement to be performed by the UE device 302, with a reference indicated by nr-DL-PRS-ReferenceInfo being the highest priority for measurement. Priorities can include up to 64 dl-PRS-IDs of the positioning frequency layer being sorted according to priority, or up to 2 DL PRS resource sets per dl-PRS-ID of the positioning frequency layer being sorted according to priority. In such cases, when the initially selected PRS resource cannot be utilized for PRS measurement purposes, the UE device 302 proceeds to the next PRS resource in an order of decreasing measurement priority. However, in some cases, the 5 selected PRS resources may not be optimal for performing PRS measurements.

Aspects of the disclosed technology address the forgoing limitations by providing solutions for improving the PRS resource selection process. In some aspects, initial PRS resource selection can be based on beam index information received at the UE, for example, from a base station (e.g., gNB), or location server (e.g., LMF). In such approaches, the beam index information can specify an assigned beam associated with a PRS resource set for which one or more location or position measurements are to be determined. For instance, the UE device can first process the PRS resource associated with the assigned beam before processing any other PRS resources associated with other beams. In some aspects, the selection of subsequent beams by the UE after processing the PRS resource of the assigned beam, for performing location or position measurements, can be based on an identified adjacency between the beams and based on a priority order, for example, that is specified by a priority rule and/or signaled to the UE (e.g., from the base station and/or location server). Depending on the desired implementation, the priority rule can be predetermined and stored on the UE, or the priority rule may be provided to the UE by another device (e.g., by the location server such as an LMF and/or by a base station such as a gNB). The priority rule can indicate to the UE how beam selection is to be performed, such as by subsequent selection of one or more adjacent beams relative to the assigned beam. As explained in further detail below, beam adjacency can be based on angular proximity/adjacency, or based on an ordering indicated by an information element (IE) (e.g., in the AD). For example, adjacent beams (or adjacent resources) can refer to those beams (or resources) that are associated with the closest angles, such as those that share the closest DL-AoD angles. Further discussion of the various approaches to selecting optimal PRS resources according to adjacency among beams and a priority order is provided in conjunction with FIGS. 4-7.

Figure 4:
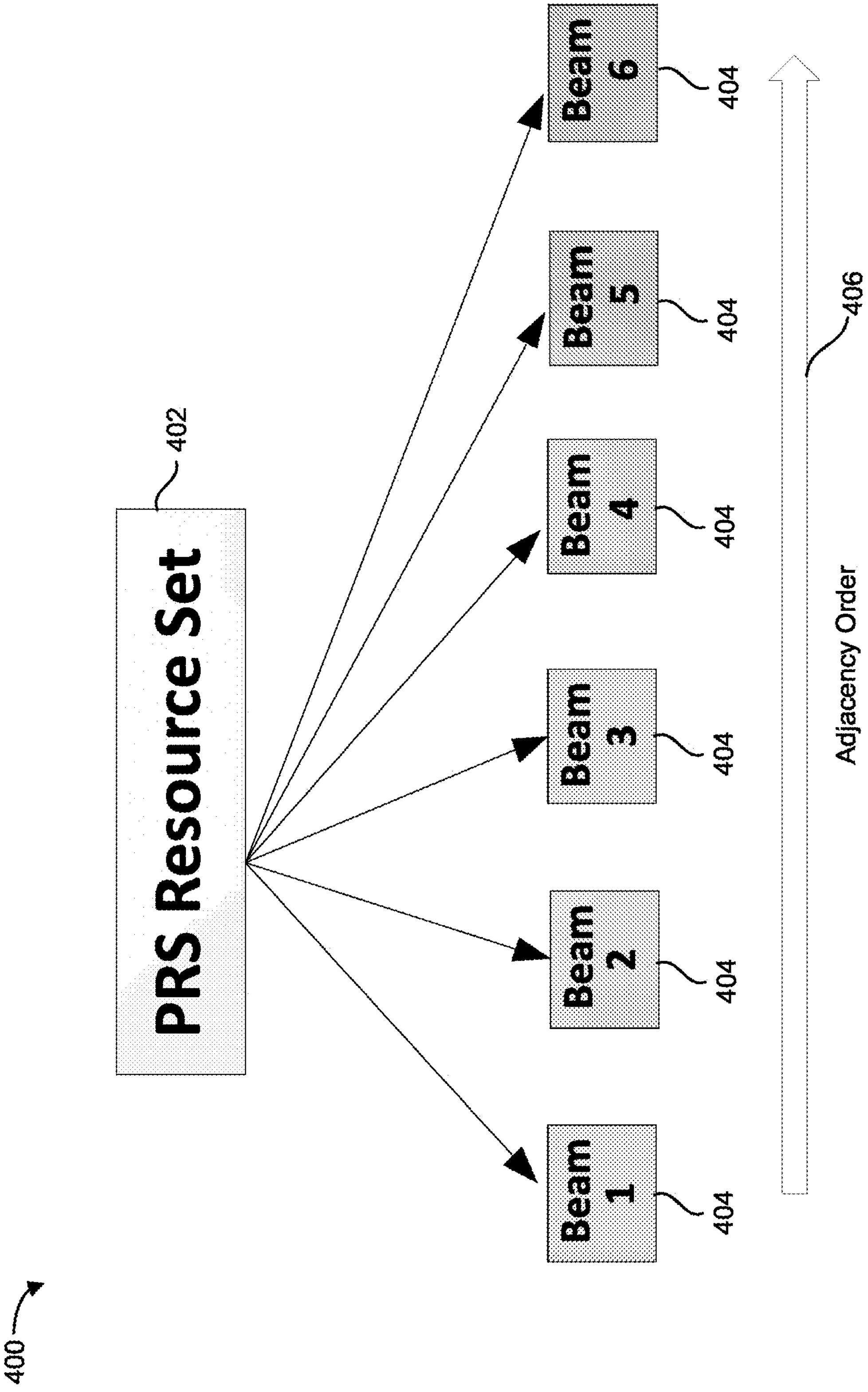
FIG. 4 illustrates an example diagram of a positioning reference signal (PRS) resource set which can be utilized by a mobile device (e.g., a UE device), according to some aspects of the present disclosure.

FIG. 4 illustrates an example diagram of a positioning reference signal (PRS) resource set 402 that can be utilized by a mobile device, (e.g., a UE device) in a PRS system 400. As described herein, positioning reference signals (PRS) can be defined for New Radio (NR) positioning to enable UE devices to detect and measure neighbor Transmission Reception Points (TRPs) for location or positioning purposes. The PRS system 400 can include various positioning configurations to support and enable a variety of deployments such as indoor, outdoor, sub-6, and mmW. In some implementations, the PRS resource set 402 can be used (e.g., by a UE device) for determining an expected angle of arrival (AoA) and/or angle of departure (AoD) formulation based on a beam assignment specified by a beam index. For example, the PRS system 400 can generate assistance data (AD) that includes beam index information specifying a beam assignment, which can then be provided to the UE device to facilitate location or positioning measurements (e.g., to determine a location of the UE device). In one illustrative example, the beam assignment specified by the beam index information can include a PRS identifier (e.g., the dl-PRS-ID of a PRS resource on a given beam).

In some implementations, the UE device can receive various DL-PRS resources, and can provide corresponding location measurement information to the LMF, for example, over LPP. Additionally, a gNB can provide beam azimuth and elevation angle information to the LMF, e.g., over NR Positioning Protocol A (NRPPa). In some aspects, TRPs can also report AoA measurements directly to the LMF. Using angle information (e.g., AoD or AoA) together with TRP co-coordinate information and beam configuration details, the LMF can estimate a location of the UE device. Downlink-based location measurements can include observed time difference of arrival (OTDOA) in LTE, downlink time difference of arrival (DL-TDOA) in NR, and downlink angle-of-departure (DL-AoD) in NR. In some examples, the UE device can receive identifiers of a reference base station (e.g., a serving base station) and multiple non-reference base stations in assistance data as described herein. For DL-AoD positioning, a base station (e.g., gNB) can measure the angle and other channel properties (e.g., signal strength) of the downlink transmit beam used to communicate with the UE device to estimate the location of the UE device.

In one example, a location server (e.g., a location management function (LMF)) can provide assistance to enable UE-assisted and UE-based New Radio downlink-angle of departure (NR DL-AoD) by determining and providing beam index information to the UE. There may be instances where each UE can have different expected AoA and zenith of arrival (ZoA) with respect to a TRP. For example, the PRS system 400 can be UE-assisted (e.g., where the UE device conducts location or positioning measurements) or UE-based (e.g., where the UE device conducts location or positioning measurements and calculations).

For the UE-assisted mode, the UE device may not be aware of a TRP beam location, which can make it difficult for the UE device to calculate a priority rule (for selecting PRS resources to process) that is based on an expected AoD. By utilizing a beam index, the UE device can determine which beam to utilize first for measuring location or positioning data. For example, the PRS system 400 can utilize a beam index rather than an expected AoD in the angular domain. In one example, the LMF can provide an expected beam index to the UE device to determine which beam to utilize first for measuring location or positioning data (using the PRS resource of that beam). The beam identified by the beam index can be referred to as an assigned beam.

The beam index can include information such an assigned PRS resource or assigned beam (e.g., with ID=X, where the ID can include dl-PRS-ID in one illustrative example). In some cases, a PRS resource ID (e.g., ID=X) in a PRS resource set (e.g., the PRS resource set 402) can be associated with a single beam (and/or beam ID) transmitted from a single TRP (where a TRP may transmit one or more beams). For example, each PRS resource of the PRS resource set 402 can be transmitted on a different beam, and as such, a "PRS resource," or simply "resource," can also be referred to herein as a "beam."

Figure 5:
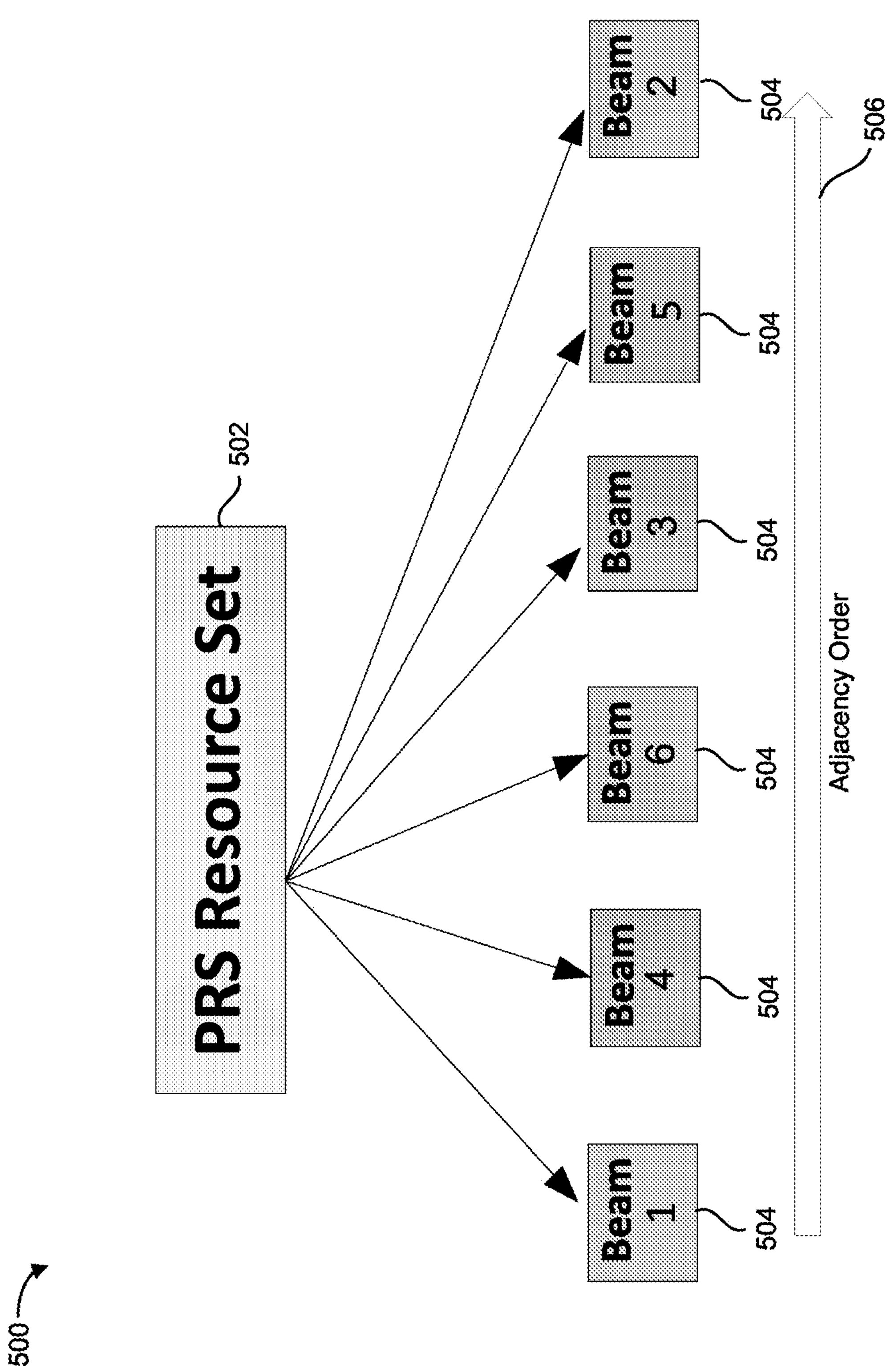
FIG. 5 illustrates another example diagram of a PRS resource set which can be utilized by a mobile device (e.g., a UE device), according to some aspects of the present disclosure.

Once the PRS resource of the assigned beam is processed by the UE device for determining location or positioning information, the UE device can use an adjacency order of the beams associated with the PRS resource set 402. An example of adjacency ordering can be based on a sequential order of beams based on angular proximity. For example, FIG. 4 illustrates a direction of adjacency that begins at beam 1 and ends at beam 6, as specified by adjacency ordering 406. The adjacency ordering 406 of FIG. 4 indicates that PRS resources (of the beams 1-6) are ordered according to angular proximity/adjacency (e.g., with respect to DL-AoD), such as where the angle of beam 1 is less than the angle of beam 2, the angle of beam 2 is less than the angle of beam 3, and so on. In the example of FIG. 4, the UE device can make an implicit assumption that PRS resources that have close-by indices (e.g., those associated with beam 1 and beam 2) also have close-by angles (close-by DL-AoDs). Another example of adjacency ordering can include a predetermined list of beams and their respective adjacency to one another. For instance, the UE may not make an implicit assumption about the adjacency, and instead can receive a dedicated signaling (e.g., an IE in the AD) indicating which resources are adjacent to other resources (e.g., by DL-AoDs) in the PRS resource set. An example of such adjacency ordering is depicted in FIG. 5, which illustrates a PRS resource set 502 having an order of beam 1, beam 4, beam 6, beam 3, beam 5, and beam 2, as specified by adjacency order 506. In some examples, the adjacency ordering (e.g., the adjacency order 506) can be defined in an IE in the AD. For instance, using the example of FIG. 5 for illustrative purposes, the IE in the AD can indicate that beam 2 is adjacent to beam 1 and beam 3, and that beam 4 is adjacent to beam 3 and beam 5.

Figure 6:
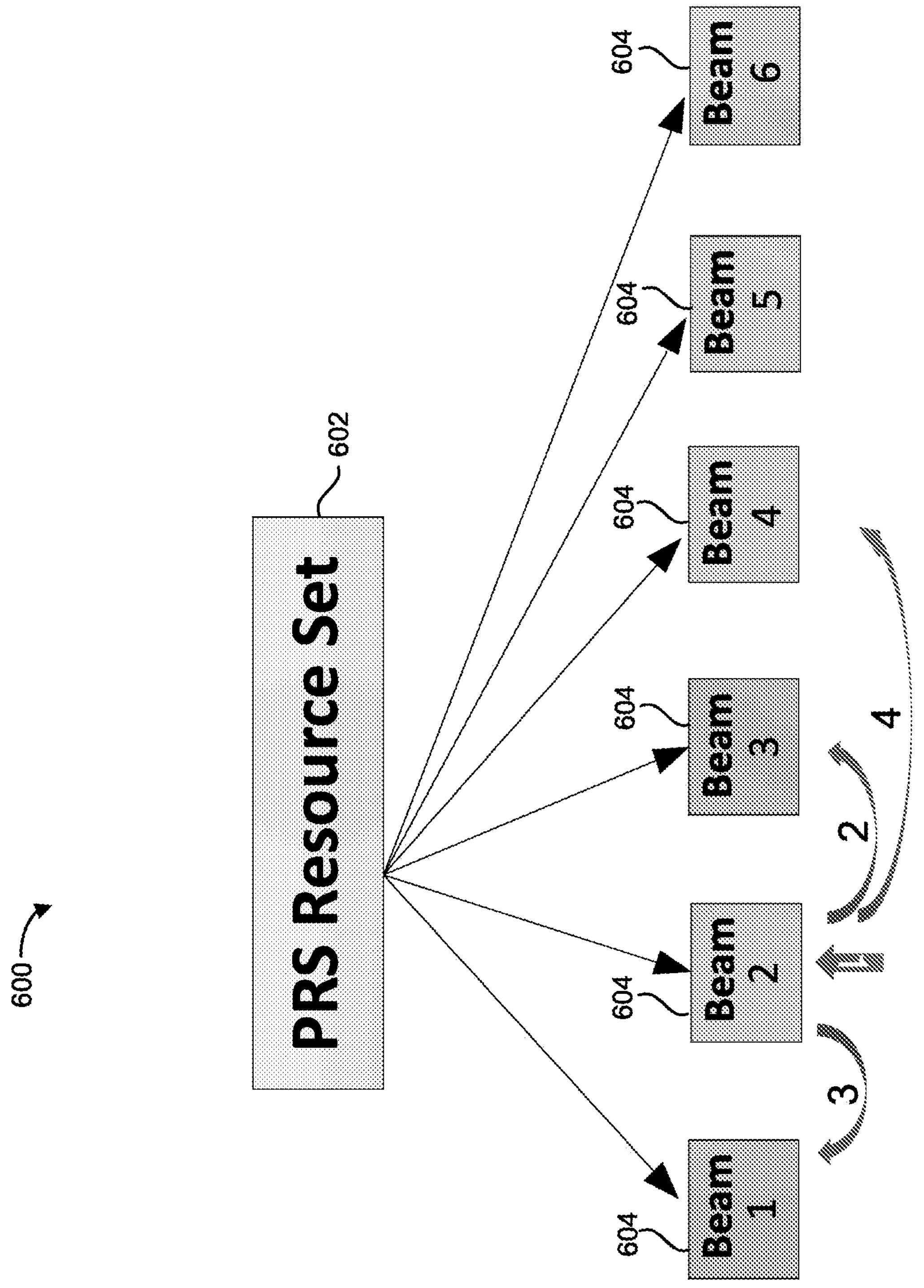
FIG. 6 illustrates yet another example diagram of a PRS resource set which can be utilized by a mobile device (e.g., a UE device), according to some aspects of the present disclosure.
Figure 7:
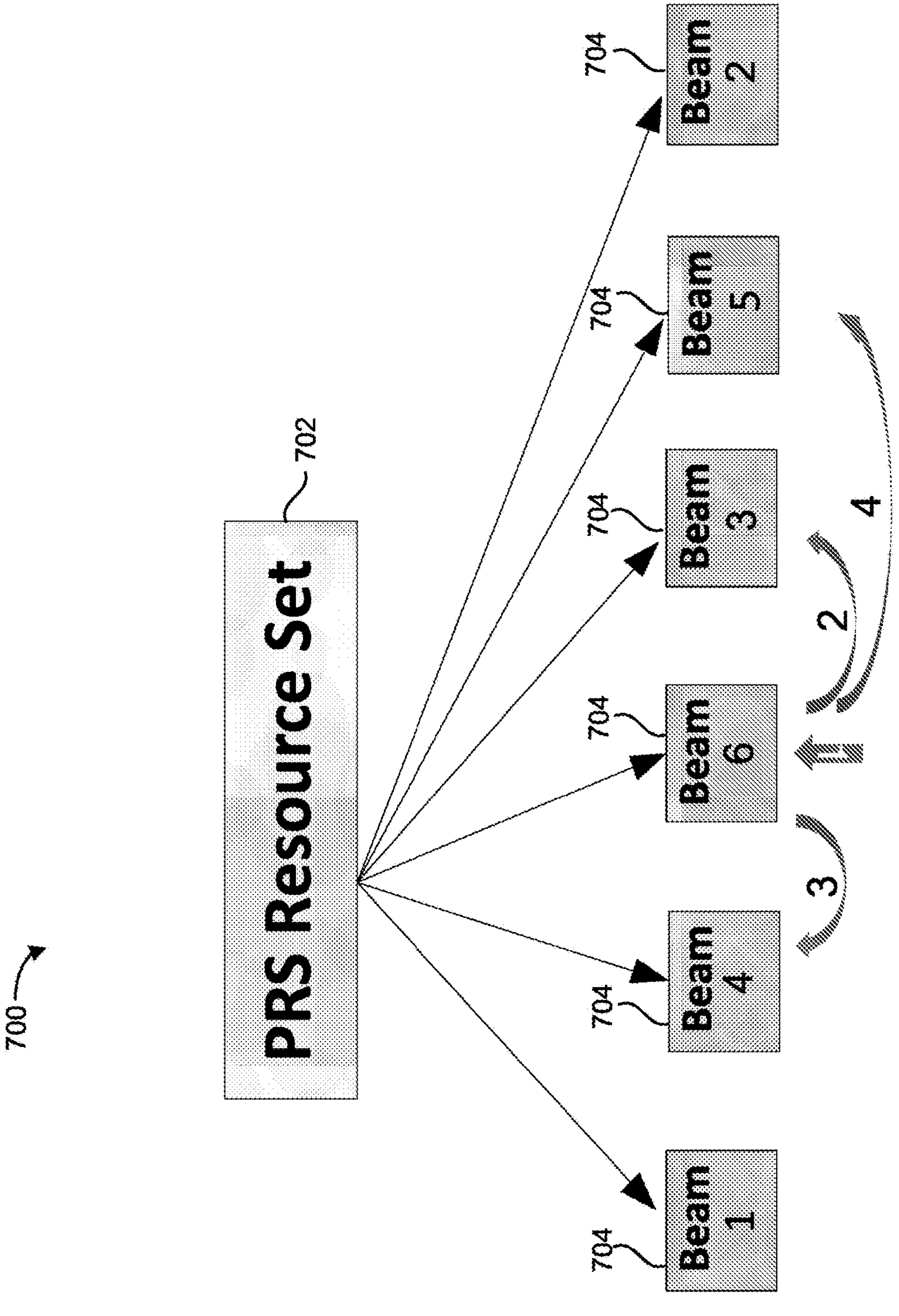
FIG. 7 illustrates an example diagram of a PRS resource set which can be utilized by a mobile device (e.g., a UE device), according to some aspects of the present disclosure.

The UE device can select from among the various beams associated with the PRS resource set 402 based on the adjacency ordering and based on a beam priority rule (also referred to as an adjacency beam rule). An example of an adjacency beam rule can include X, X−1, X+1, X−2, X+2, X−3, X+4, etc., as illustrated in FIGS. 6 and 7, where X is the assigned beam indicated by the beam index information and X−I, X+I, etc. are the adjacent beams selected according to the priority order rule. The UE device is able to determine which beam(s) is/are adjacent to the assigned beam X based on the adjacency ordering noted above. In this example, once the PRS resource associated with the assigned beam X is processed (e.g., and/or is not suitable for location or position measurements), the UE device can select the PRS resource associated with the next beam in the priority order, which in the example above would be the beam X−1 determined based on the adjacency order (e.g., to the left of assigned beam X according to the adjacency order).

In some aspects, location and positioning functions can be aided by the LMF that is configured for communication with a 5GC to provide location assistance for the UE device. The LMF can be implemented as a plurality of separate servers (e.g., physically separate servers, different software modules on a single server, different software modules spread across multiple physical servers, etc.), or alternately may each correspond to a single server. The LMF can be configured to support one or more location services for UEs that can connect to the LMF via a core network, 5GC, and/or via the Internet (not illustrated).

As described herein, the LMF (and/or in some cases a base station, such as a gNB) can determine the beam index and provide the beam index to the UE device. The UE device can utilize the beam index to facilitate the measurement of location or position data. In some cases, the LMF can generate the beam index based on TRP locations, antenna array panel locations (e.g., when co-located on the same base station), and/or a coarse UE device location. In some cases, when the UE device is mobile (e.g., is moving), the LMF can update the beam index at multiple time intervals such as Time 1 and Time 2, and provide updated beam indexes to the mobile UE device based on where the UE device is located. For instance, the LMF can provide a beam index that indicates a particular beam that is directed at the UE at Time 1, and can provide a different beam index that indicates a different beam that is directed at the UE at Time 2.

To further assist location or positioning operations, the LMF (and/or in some cases a base station, such as a gNB) can provide assistance data to the UE device. For example, the assistance data may include identifiers of the base stations (or the cells and/or TRPs of the base stations) from which to measure reference signals, the reference signal configuration parameters (e.g., the number of consecutive positioning subframes, periodicity of positioning subframes, muting sequence, frequency hopping sequence, reference signal identifier (ID), reference signal bandwidth, etc.), and/or other parameters applicable to the particular positioning method. In some cases, the assistance data may originate directly from the base stations themselves (e.g., in periodically broadcasted overhead messages, etc.). In some cases, the UE device can detect neighbor network nodes itself without the use of assistance data.

Referring to FIG. 4, the UE device can receive assistance data from the LMF or base station for AoA/AoD including a beam index that is associated with a PRS resource set 402. The PRS resource set 402 can be associated with a plurality of beams 404 that are sequenced in an adjacency order 406. For example, the beam index can include an initial, assigned beam to be utilized by the UE device. For example, if beam 1 is the assigned beam for the UE device, the UE device will attempt to begin location or position measuring operations with beam 1. In some cases, the beam index can include information that provides the UE device with a beam order (e.g., beam 1, beam 2, beam 3, beam 4, beam 5, and beam 6).

In some cases, the assistance data can further identify (e.g., using an IE) adjacent beams that the UE device can utilize perform location measurements when the assigned beam is not ideal for location or position measurements. In some cases, the adjacency of the beams can be pre-defined, such as PRS resources (beams) being ordered according to angular proximity/adjacency. For example, adjacent beams can include neighboring beams in the beam order, as shown in FIG. 4. In the example of FIG. 4, the UE device assumes that PRS resources that have close-by indices (e.g., those associated with beam 1 and beam 2) also have close-by angles. For instance, as shown in FIG. 4, a UE device can assume that beam 1 is adjacent to beam 2, which is adjacent to beam 3, which is adjacent to beam 4, which is adjacent to beam 5, which is adjacent to beam 6. In this example and using beam 1 as the assigned beam identified by the beam index, after the PRS resource of beam 1 is processed, the UE device can process beam 2, which is the next adjacent beam. In some cases, if beam 1 is not ideal for location or position measurements (e.g., too much interference or low signal strength), the UE device can process the PRS resource associated with the next adjacent beam, which in this example is beam 2. After processing beam 2, the UE device can process the PRS associated with beam 3, and so forth. In some cases, a priority order (e.g., an adjacency beam rule) can also be known by the UE (e.g., predetermined) or signaled to the UE. As described herein, the priority order (e.g., the adjacency beam rule) can provide information relating to which PRS resources of which adjacent beams to process (for location or position measurements) after the PRS resource associated with the assigned beam is processed.

FIG. 5 illustrates an example diagram of a positioning reference signal (PRS) resource set 502 that can be utilized by a mobile device, (e.g., a UE device) in a PRS system 500. In some implementations, the UE device can receive assistance data from the LMF or base station that includes a beam index, which is associated with a PRS resource set 502. The PRS resource set 502 can be associated with a plurality of beams 504 that are sequenced in a predetermined adjacency order. As noted above, the beam index can include information that indicates an initial assigned beam that is to be used by the UE device for computing location or position measurements.

In some aspects, an adjacency beam rule (or priority rule) can be used to specify subsequent beam selections that are to be made by the UE after processing the PRS resource of the assigned beam. Depending on the implementation, beam selection prioritization can be based on the initially assigned beam, as well as based on the determined adjacency ordering (e.g., the adjacency order 406 of FIG. 4 or the adjacency order 506 of FIG. 5). Using FIG. 5 as an illustrative example, an IE can indicate that the adjacency order of the PRS resource set 502 is: beam 1, beam 4, beam 6, beam 3, beam 5, and beam 2. In this example, if beam 6 is an assigned beam identified by the beam index, the UE device can first process the PRS resource associated with beam 6. The priority order may indicate that, after processing the PRS resource associated with beam 6, the UE device is to next process the PRS resource associated with the adjacent beam to the left of beam 6 (which is beam 4), then process the PRS resource associated with the adjacent beam to the right of beam 6 (which is beam 3), then process the PRS resource associated with the adjacent beam two beams to the left of beam 6 (which is beam 1), and finally process the PRS resource associated with the adjacent beam two beams to the right of beam 6 (which is beam 5).

FIG. 6 illustrates an example diagram of a positioning reference signal (PRS) resource set 602 that can be utilized by a mobile device, (e.g., a UE device) in a PRS system 600, similar to the PRS system 400 in FIG. 4. In this embodiment, the UE device can receive assistance data from an LMF that includes a beam index. The UE can receive a PRS resource set 602 that is associated with a plurality of beams 604, which can be utilized by the UE device to measure location or position data that can be used to determine a location or position of the UE. FIG. 6 illustrates a beam adjacency order of beam 1, beam 2, beam 3, beam 4, beam 5, and beam 6. As discussed above, the beam order can be known by the UE (e.g., predetermined and/or stored on a memory of the UE device) or can be signaled to the UE (e.g., in an IE of the assistance data) by the gNB or LMF.

The beam index can include an assigned beam that the UE device initially uses to perform location measurements. In this implementation, beam 2 is the assigned beam, as indicated in the beam index, to be utilized by the UE device. Once the PRS resource of beam 2 is processed by the UE device to determine location or positioning data, the UE device can process the PRS resources of adjacent beams (e.g., beam 1 or beam 3) pursuant to one or more priority rules (also referred to as an adjacency beam rule) known by the UE device (e.g., predetermined and/or stored on a memory of the UE device) or signaled to the UE device by the gNB or LMF. Once the PRS resources of beams 1 and 3 are processed by the UE device, the UE device can proceed to process the PRS resource of the next adjacent beam, for example, beam 4. In some cases, adjacent beams can be indicated in the beam index to notify the UE device which beams are adjacent to the initial assigned beam and subsequent beams.

As noted above, a priority rule can be known by the UE device or signaled to the UE device. The priority rule can indicate which beam to utilize after the assigned beam is processed for measuring location or position data. For example, FIG. 6 illustrates a priority rule with an order that begins with beam 2 (the assigned beam), followed by beam 3, followed by beam 1, followed by beam 4.

FIG. 7 illustrates an example diagram of a positioning reference signal (PRS) resource set 702 that can be utilized by a mobile device, (e.g., a UE device) in a PRS system 700, similar to the PRS system 500 in FIG. 5. In this embodiment, the UE device can receive assistance data from an LMF that includes a beam index. The UE can receive a PRS resource set 602 that is associated with a plurality of beams 604, which can be utilized by the UE device to measure location or position data that can be used to determine a position of the UE. FIG. 7 illustrates a beam adjacency order of beam 1, beam 4, beam 6, beam 3, beam 5, and beam 2. As discussed above, the beam adjacency order can be known by the UE (e.g., predetermined and/or stored on a memory of the UE device), such as shown in FIG. 4, or can be signaled to the UE (e.g., in an IE of the assistance data) by the gNB or LMF, such as shown in FIG. 5.

The beam index can include an assigned beam that the UE device initially attempts to measure location or position data. In this implementation, beam 6 is the assigned beam, as indicated in the beam index, to be utilized by the UE device. Once the PRS resource of beam 6 is processed by the UE device to determine location or positioning data, the UE device can process the PRS resources of adjacent beams (e.g., beam 4 or beam 3) pursuant to one or more priority rules (e.g., an adjacency beam rule) known by the UE device (e.g., predetermined and/or stored on a memory of the UE device) or signaled to the UE device by the gNB or LMF. Once the PRS resources of beams 4 and 3 are processed by the UE device, the UE device can proceed to process the PRS resource of the next adjacent beam, for example, beam 5, based on the priority rule (e.g., the adjacency beam rule).

As noted above, a priority rule can be known by the UE device or signaled to the UE device. The priority rule can indicate which beam to utilize after the assigned beam is processed for measuring location or position data. For example, FIG. 7 illustrates a priority rule with an order that begins with beam 6 (the assigned beam), followed by beam 3, followed by beam 4, followed by beam 5.

Figure 8:
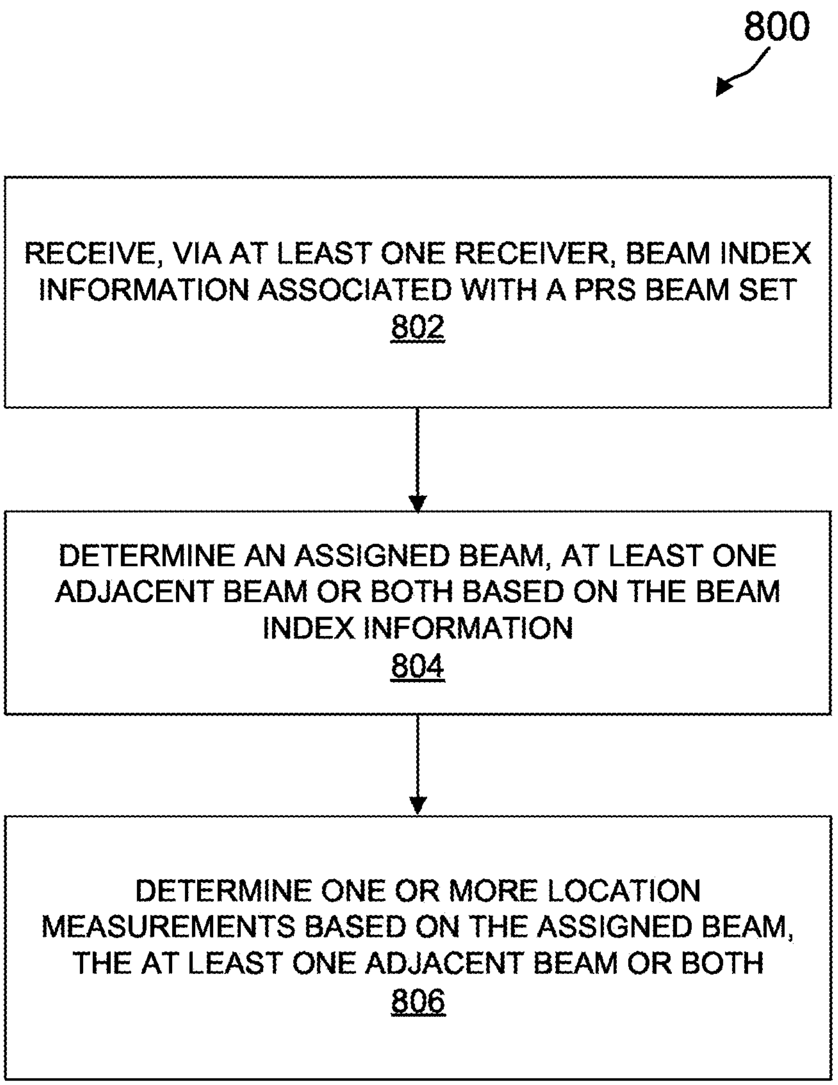
FIG. 8 illustrates an example flow diagram of a process for determining adjacent beams associated with a PRS resource set, according to some aspects of the present disclosure.

FIG. 8 illustrates a flow diagram of an example process 800 for facilitating beam selection by a UE device. At block 802, the process 800 includes receiving (e.g., by a user equipment) beam index information associated with a PRS beam set. In some implementations, the PRS beam set can be associated with a plurality of beams, the plurality of beams including the assigned beam and the at least one adjacent beam. The plurality of beams associated with the PRS beam set can also be sequentially ordered by adjacency in an angular domain (e.g., according to DL-AoD). In some aspects, the beam index information can be a PRS resource index.

In some aspects, the beam index information can be generated based on at least one of a transmission reception point (TRP) location, an antenna array panel location, an estimated user equipment (UE) location, or a combination thereof. In other aspects, the beam index information can be received from a base station or a location server.

At block 804, the process 800 includes determining (e.g., by the user equipment) an assigned beam, at least one adjacent beam or both based on the beam index information indicated in block 802. In some aspects, the assigned beam can be based on at least one of an expected beam index, an expected PRS resource index, a reference PRS resource, or a combination thereof. In some aspects, the at least one adjacent beam can be further determined based on an adjacency beam rule stored at the user equipment. In other aspects, the at least one adjacent beam can be further determined based on an adjacency beam rule that is received from a location server.

In some implementations, the at least one adjacent beam can be further determined based on an adjacency beam rule that is received from a base station. In one example, the at least one adjacent beam can be physically adjacent to the assigned beam in at least one of an azimuth domain, an elevation domain, or a combination thereof.

In some examples, determining the at least one adjacent beam can comprise: determining a first adjacent beam based on the assigned beam and the beam index information, wherein the first adjacent beam is adjacent to the assigned beam; and determining a second adjacent beam based on the assigned beam and the beam index information, wherein the second adjacent beam is adjacent to the assigned beam, and wherein the first adjacent beam is different from the second adjacent beam. In another example, determining the at least one adjacent beam can comprise: determining a third adjacent beam based on the assigned beam and the beam index information, wherein the third adjacent beam is adjacent to the first adjacent beam; and determining a fourth adjacent beam based on the assigned beam and the beam index information, wherein the fourth adjacent beam is adjacent to the second adjacent beam, and wherein the third adjacent beam is different from the fourth adjacent beam.

At block 806, the process 800 includes determining (e.g., by the user equipment) a location measurement based on at least one of the assigned beam, or the at least one adjacent beam indicated in block 804. In some examples, the location measurement can include at least one of a downlink angle of departure, a PRS-based reference signal received power (RSRP) measurement, time of arrival of an earliest path, phase information, amplitude information, location information, or a combination thereof.

In some implementations, the process 800 can further include receiving updated beam index information associated with an updated PRS beam set.

Figure 9:
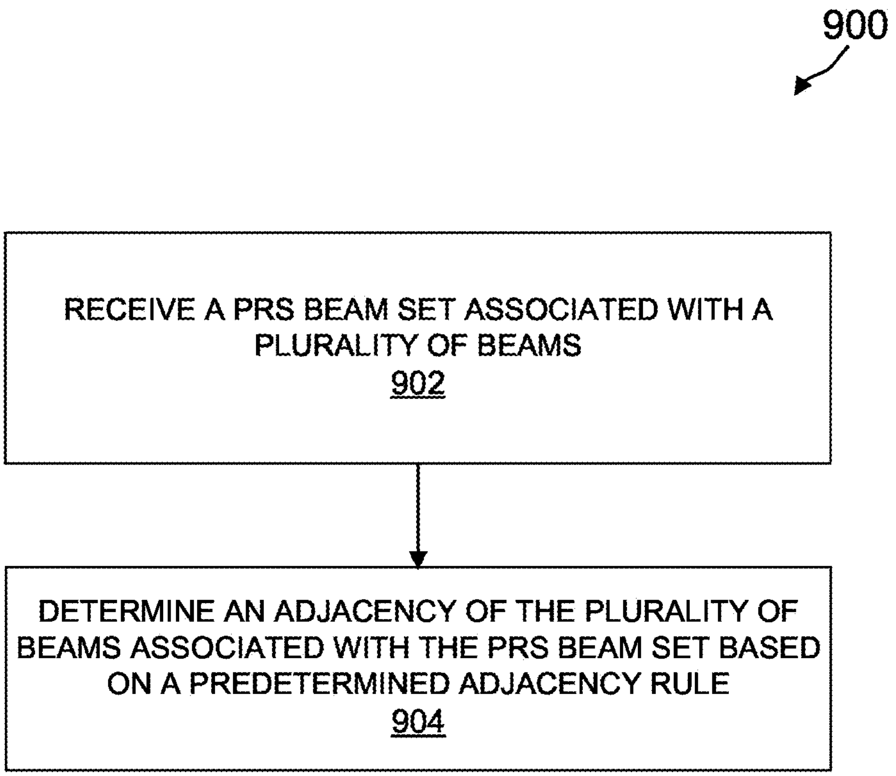
FIG. 9 illustrates an example flow diagram of a process for determining a beam adjacency based on a predetermined rule, according to some aspects of the disclosed technology.

FIG. 9 illustrates an example flow diagram of a process 900 for determining a beam adjacency based on a predetermined rule (e.g., a predetermined adjacency beam rule), according to some aspects of the disclosed technology. At block 902, the process 900 includes receiving (e.g., by a user equipment device) a PRS beam set. As discussed above, the PRS beam set can be associated with a plurality of beams, including an assigned beam and at least one adjacent beam.

At block 904, the process 900 includes determining an adjacency of the plurality of beams associated with the PRS beam set received in block 902, for example, based on the predetermined adjacency beam rule. As discussed above, the predetermined adjacency beam rule can be stored on a memory associated with the UE device. In some examples, the adjacency of the beams can be pre-defined, such as PRS resources (beams) being ordered according to angular proximity/adjacency. For example, adjacent beams can include neighboring beams in the beam order, as shown in FIG. 4, discussed above.

Figure 10:
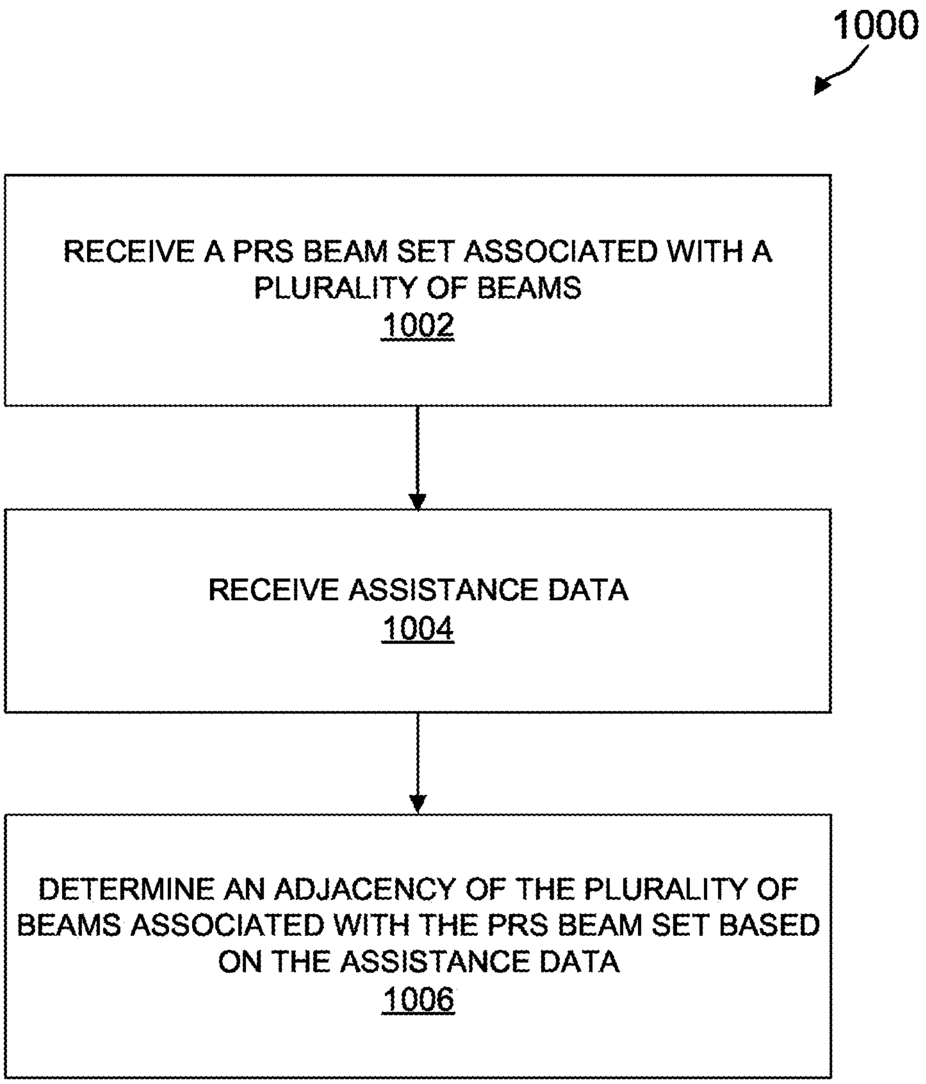
FIG. 10 illustrates an example flow diagram of a process for determining a beam adjacency based on assistance data (AD), according to some aspects of the disclosed technology.

FIG. 10 illustrates an example flow diagram of a process 1000 for determining a beam adjacency based on assistance data (AD), according to some aspects of the disclosed technology. At block 1002, the process 1000 includes receiving (e.g., by a user equipment device) a PRS beam set. As discussed above, the PRS beam set can be associated with a plurality of beams, including an assigned beam and at least one adjacent beam.

At block 1004, the process 1000 includes receiving assistance data from another device, such as a location server (e.g. an LMF), or a base station (e.g., a gNB). As discussed above, the assistance data may include identifiers of the base stations (or the cells and/or TRPs of the base stations) from which to measure reference signals, the reference signal configuration parameters (e.g., the number of consecutive positioning subframes, periodicity of positioning subframes, muting sequence, frequency hopping sequence, reference signal identifier (ID), reference signal bandwidth, etc.), and/or other parameters applicable to the particular positioning method. Alternatively, the assistance data may originate directly from the base stations themselves (e.g., in periodically broadcasted overhead messages, etc.).

At block 1006, the process 1000 includes determining an adjacency of the plurality of beams associated with the PRS beam set based on the assistance data. For example, the assistance data can include a beam priority rule that indicates an adjacency order of the plurality of beams to the UE. As noted above, the assistance data can also include a beam index can provides information indicating an initial assigned beam that is to be used by the UE device for computing location or position measurements.

In some aspects, an adjacency beam rule (or priority rule) can be used to specify subsequent beam selections that are to be made by the UE after processing the PRS resource of the assigned beam. Depending on the implementation, beam selection prioritization can be based on the initially assigned beam, as well as based on the determined adjacency ordering (e.g., the adjacency order 406 of FIG. 4 or the adjacency order 506 of FIG. 5).

In some examples, the processes described herein (e.g., processes 800, 900, 1200 and/or other processes described herein) may be performed by a computing device or apparatus. In one example, the processes 800, 900, and/or 1000 can be performed by a computing device or the computing system 1200 shown in FIG. 12.

In some examples, the computing device can include any suitable UE device or system, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein. For instance, as noted above, a UE device can be configured to perform the process 800.

In some examples, the computing device can include a base station, such as a gNB and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the operations or steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), Vision Processing Units (VPUs), Network Signal Processors (NSPs), microcontrollers (MCUs) and/or other suitable electronic circuits), and/or can include and/or be implemented using computer software, firmware, or any combination thereof, to perform the various operations described herein.

Process 800 illustrates a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 800 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
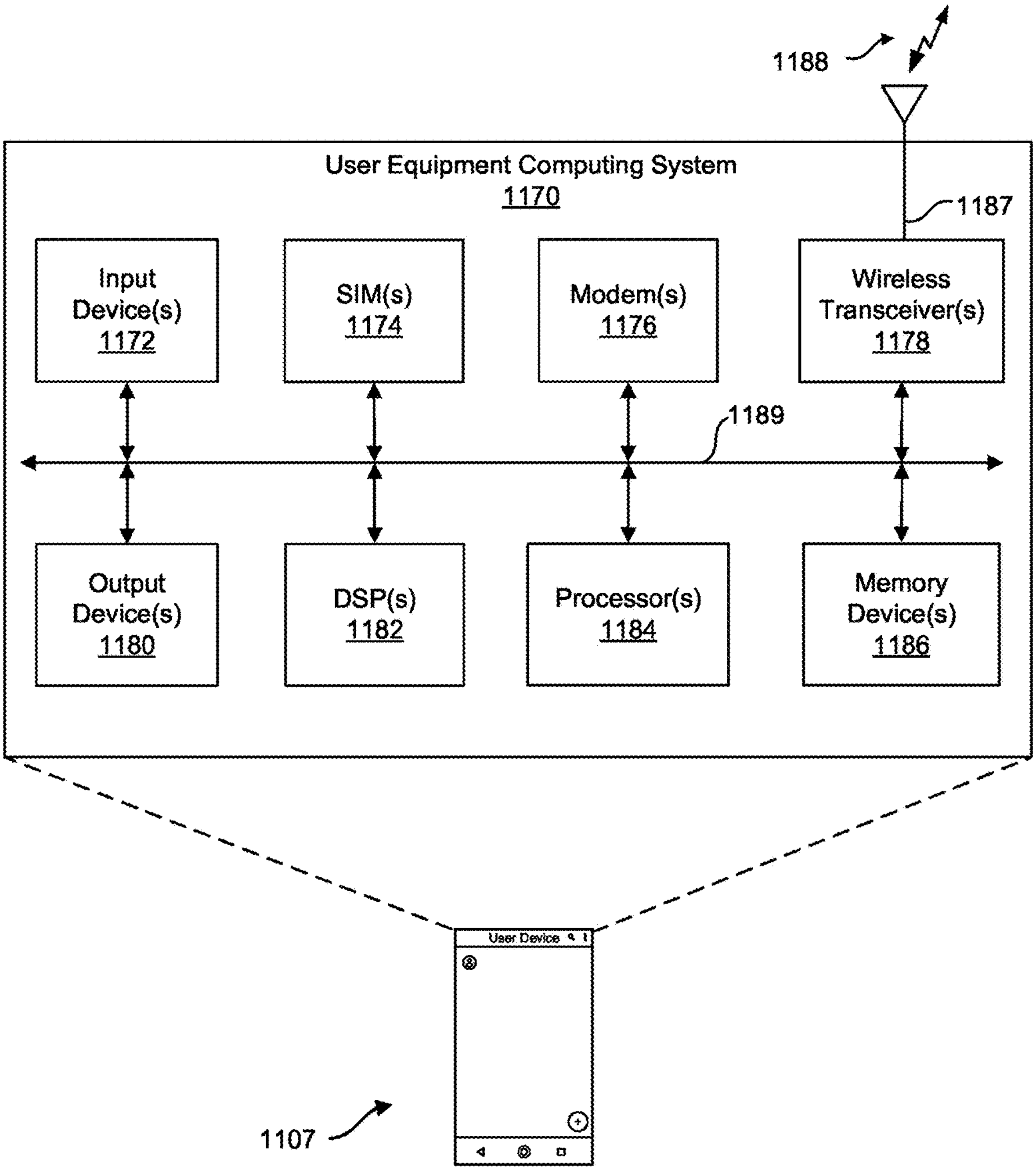
FIG. 11 illustrates an example block diagram of a computing system of a user equipment (UE), in accordance with some aspects of the present disclosure.

FIG. 11 illustrates an example of a computing system 1170 of a user equipment (UE) 1107. In some examples, the UE 1107 can include a mobile phone, router, tablet computer, laptop computer, tracking device, wearable device (e.g., a smart watch, glasses, an XR device, etc.), Internet of Things (IoT) device, and/or other device used by a user to communicate over a wireless communications network. The computing system 1170 includes software and hardware components that can be electrically coupled via a bus 1189 (or may otherwise be in communication, as appropriate). For example, the computing system 1170 includes one or more processors 1184. The one or more processors 1184 can include one or more CPUs, ASICs, FPGAs, APs, GPUs, VPUs, NSPs, microcontrollers, dedicated hardware, any combination thereof, and/or other processing device or system. The bus 1189 can be used by the one or more processors 1184 to communicate between cores and/or with the one or more memory devices 1186.

The computing system 1170 may also include one or more memory devices 1186, one or more digital signal processors (DSPs) 1182, one or more subscriber identity modules (SIMs) 1174, one or more modems 1176, one or more wireless transceivers 1178, an antenna 1187, one or more input devices 1172 (e.g., a camera, a mouse, a keyboard, a touch sensitive screen, a touch pad, a keypad, a microphone, and/or the like), and one or more output devices 1180 (e.g., a display, a speaker, a printer, and/or the like). As used herein, the one or more wireless transceivers 1178 can include one or more receiving devices (e.g., receivers) and/or one or more transmitting devices (e.g., transmitters).

The one or more wireless transceivers 1178 can transmit and receive wireless signals (e.g., signal 1188) via antenna 1187 to and from one or more other devices, such as one or more other UEs, network devices (e.g., base stations such as eNBs and/or gNBs, WiFi routers, etc.), cloud networks, and/or the like. As described herein, the one or more wireless transceivers 1178 can include a combined transmitter/receiver, discrete transmitters, discrete receivers, or any combination thereof. In some examples, the computing system 1170 can include multiple antennae. The wireless signal 1188 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 1178 may include a radio frequency (RF) front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 1188 into a baseband or intermediate frequency and can convert the RF signals to the digital domain.

In some cases, the computing system 1170 can include a coding-decoding device (or CODEC) configured to encode and/or decode data transmitted and/or received using the one or more wireless transceivers 1178. In some cases, the computing system 1170 can include an encryption-decryption device or component configured to encrypt and/or decrypt data (e.g., according to the AES and/or DES standard) transmitted and/or received by the one or more wireless transceivers 1178.

The one or more SIMs 1174 can each securely store an International Mobile Subscriber Identity (IMSI) number and a related key assigned to the user of the UE 1107. The IMSI and the key can be used to identify and authenticate the subscriber when accessing a network provided by a network service provider or operator associated with the one or more SIMs 1174. The one or more modems 1176 can modulate one or more signals to encode information for transmission using the one or more wireless transceivers 1178. The one or more modems 1176 can also demodulate signals received by the one or more wireless transceivers 1178 in order to decode the transmitted information. In some examples, the one or more modems 1176 can include a 4G (or LTE) modem, a 5G (or NR) modem, a Bluetooth™ modem, a modem configured for vehicle-to-everything (V2X) communications, and/or other types of modems. In some examples, the one or more modems 1176 and the one or more wireless transceivers 1178 can be used for communicating data for the one or more SIMs 1174.

The computing system 1170 can also include (and/or be in communication with) one or more non-transitory machine-readable storage media or storage devices (e.g., one or more memory devices 1186), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 1186 and executed by the one or more processor(s) 1184 and/or the one or more DSPs 1182. The computing system 1170 can also include software elements (e.g., located within the one or more memory devices 1186), including, for example, an operating system, device drivers, executable libraries, and/or other code, such as one or more application programs, which may comprise computer programs implementing the functions provided by various embodiments, and/or may be designed to implement methods and/or configure systems, as described herein.

In some aspects, the UE 1107 can include means for performing operations described herein. The means can include one or more of the components of the computing system 1170. For example, the means for performing operations described herein may include one or more of input device(s) 1172, SIM(s) 1174, modems(s) 1176, wireless transceiver(s) 1178, output device(s) (1180), DSP(s) 1182, processors (1184), memory device(s) 1186, and/or antenna(s) 1187.

In some aspects, the UE 1107 can include means for receiving resource configuration information, wherein the resource configuration information is based on a threshold associated with the apparatus, and wherein the resource configuration information indicates a time-gap for transmission of Sounding Reference Signal (SRS) resources. In some aspects, the UE 1107 may further include means for transmitting one or more SRS resources based on the time-gap indicated by the resource configuration information.

In some examples, the means for receiving can include the one or more wireless transceivers 1178, the one or more modems 1176, the one or more SIMs 1174, the one or more processors 1184, the one or more DSPs 1182, the one or more memory devices 1186, any combination thereof, or other component(s) of the client device. In some examples, the means for determining can include the one or more processors 1184, the one or more DSPs 1182, the one or more memory devices 1186, any combination thereof, or other component(s) of the client device. In some examples, the means for transmitting can include the one or more wireless transceivers 1178, the one or more modems 1176, the one or more SIMs 1174, the one or more processors 1184, the one or more DSPs 1182, the one or more memory devices 1186, any combination thereof, or other component(s) of the client device.

Figure 12:
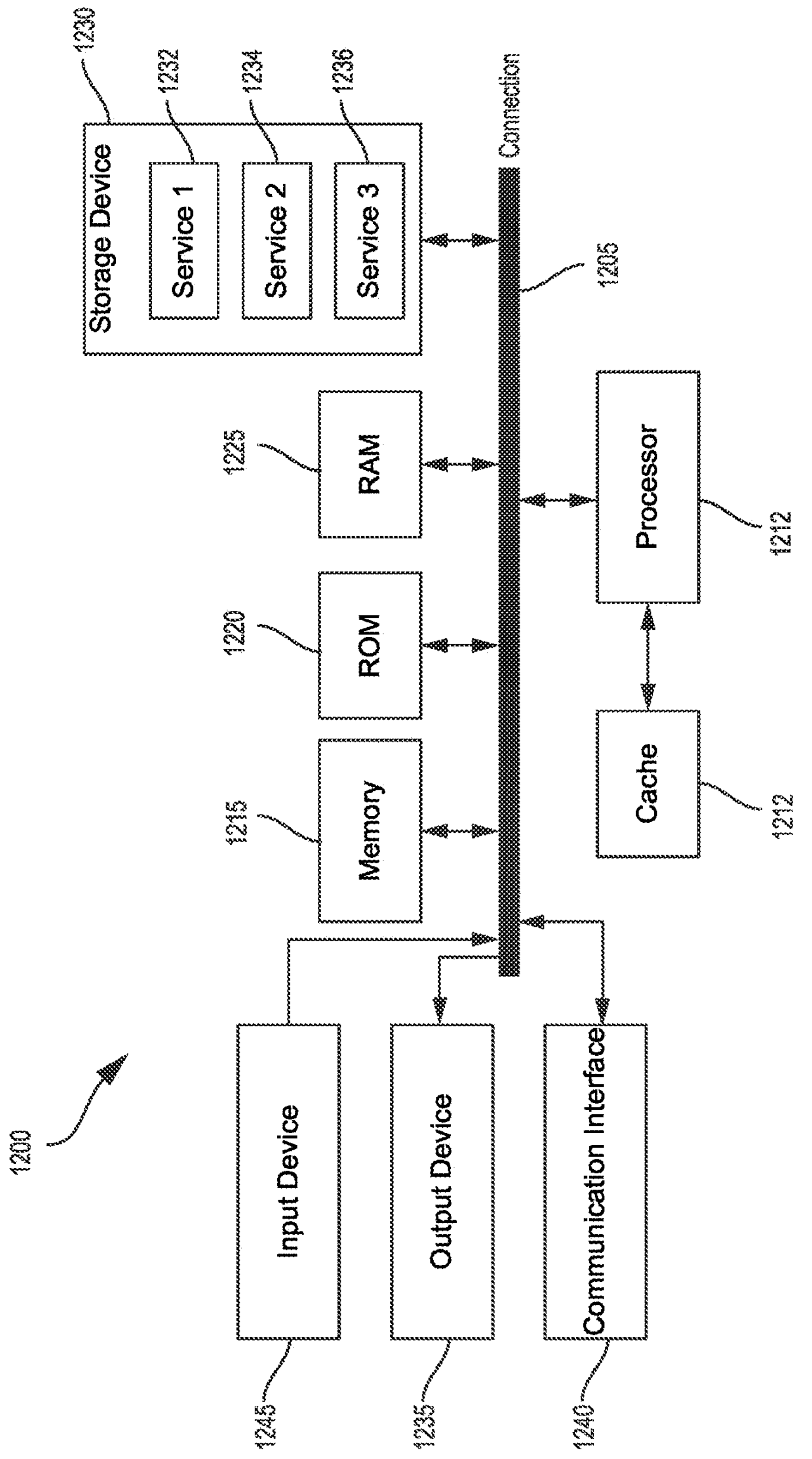
FIG. 12 illustrates an example computing system, according to aspects of the disclosure.

FIG. 12 is a diagram illustrating an example of a system for implementing certain aspects of the present technology. In particular, FIG. 12 illustrates an example of computing system 1200, which can be for example any computing device making up internal computing system, a remote computing system, a camera, or any component thereof in which the components of the system are in communication with each other using connection 1005. Connection 1005 can be a physical connection using a bus, or a direct connection into processor 1012, such as in a chipset architecture. Connection 1005 can also be a virtual connection, networked connection, or logical connection.

In some embodiments, computing system 1200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1200 includes at least one processing unit (CPU or processor) 1012 and connection 1005 that couples various system components including system memory 1215, such as read-only memory (ROM) 1220 and random-access memory (RAM) 1225 to processor 1012. Computing system 1200 can include a cache 1212 of high-speed memory connected directly with, in close proximity to, or integrated as part of processor 1012.

Processor 1012 can include any general-purpose processor and a hardware service or software service, such as services 1232, 1234, and 1236 stored in storage device 1230, configured to control processor 1012 as well as a special-purpose processor where software instructions are incorporated into the actual processor design. Processor 1012 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms. In some instances, multimodal systems can enable a user to provide multiple types of input/output to communicate with computing system 1200. Computing system 1200 can include communications interface 1240, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1230 can include software services, servers, services, etc., that when the code that defines such software is executed by the processor 1012, it causes the system to perform a function. In some embodiments, a hardware service that performs a particular function can include the software component stored in a computer-readable medium in connection with the necessary hardware components, such as processor 1012, connection 1005, output device 1235, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections.

Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data that cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative Aspects of the Disclosure Include:

Aspect 1: an apparatus for facilitating positioning reference signal (PRS) prioritization, the apparatus comprising: at least one transceiver; at least one memory; and at least one processor coupled to the at least one receiver and the at least one memory and configured to: receive, via the at least one receiver, beam index information associated with a PRS beam set; determine an assigned beam, at least one adjacent beam or both based on the beam index information and determine one or more location measurements based on at least one of the assigned beam, the at least one adjacent beam or both.

Aspect 2: the apparatus of aspect 1, wherein the at least one adjacent beam is further determined based on an adjacency beam rule stored in the at least one memory.

Aspect 3: the apparatus of any of aspects 1-2, wherein the at least one adjacent beam is further determined based on an adjacency beam rule that is received from a location server.

Aspect 4: the apparatus of any of aspects 1-3, wherein the at least one adjacent beam is further determined based on an adjacency beam rule that is received from a base station.

Aspect 5: the apparatus of any of aspects 1-4, wherein the PRS beam set is associated with a plurality of beams, the plurality of beams including the assigned beam and the at least one adjacent beam.

Aspect 6: the apparatus of any of aspects 1-5, wherein the plurality of beams associated with the PRS beam set are sequentially ordered by adjacency in an angular domain.

Aspect 7: the apparatus of any of aspects 1-6, wherein the at least one adjacent beam is physically adjacent to the assigned beam in at least one of an azimuth domain, an elevation domain, or a combination thereof Aspect 8: the apparatus of any of aspects 1-7, wherein the beam index information is generated based on at least one of a transmission reception point (TRP) location, an antenna array panel location, an estimated user equipment (UE) location, or a combination thereof Aspect 9: the apparatus of any of aspects 1-8, wherein the beam index information is received from a base station.

Aspect 10: the apparatus of any of aspects 1-9, wherein the beam index information is received from a location server.

Aspect 11: the apparatus of any of aspects 1-10, wherein the location measurement includes at least one of a downlink angle of departure, a PRS-based reference signal received power (RSRP) measurement, time of arrival of an earliest path, phase information, amplitude information, location information, or a combination thereof Aspect 12: the apparatus of any of aspects 1-11, wherein the at least one processor is further configured to receive, via the at least one receiver, updated beam index information associated with an updated PRS beam set.

Aspect 13: the apparatus of any of aspects 1-12, wherein the beam index information is a PRS resource index.

Aspect 14: the apparatus of any of aspects 1-13, wherein the assigned beam is based on at least one of an expected beam index, an expected PRS resource index, a reference PRS resource, or a combination thereof Aspect 15: the apparatus of any of aspects 1-14, wherein, to determine the at least one adjacent beam, the processor is further configured to: determine a first adjacent beam based on the assigned beam and the beam index information, wherein the first adjacent beam is adjacent to the assigned beam; and determine a second adjacent beam based on the assigned beam and the beam index information, wherein the second adjacent beam is adjacent to the assigned beam, and wherein the first adjacent beam is different from the second adjacent beam.

Aspect 16: the apparatus of any of aspects 1-15, wherein, to determine the at least one adjacent beam, the processor is further configured to: determine a third adjacent beam based on the assigned beam and the beam index information, wherein the third adjacent beam is adjacent to the first adjacent beam; and determine a fourth adjacent beam based on the assigned beam and the beam index information, wherein the fourth adjacent beam is adjacent to the second adjacent beam, and wherein the third adjacent beam is different from the fourth adjacent beam.

Aspect 17: a computer-implemented method for facilitating positioning reference signal (PRS) prioritization, the method comprising: receiving, at a user equipment, beam index information associated with a PRS beam set; determining, by the user equipment, an assigned beam, at least one adjacent beam or both based on the beam index information; and determining, by the user equipment, one or more location measurements based on at least one of the assigned beam, the at least one adjacent beam, or both.

Aspect 18: the computer-implemented method of aspect 17, wherein the at least one adjacent beam is further determined based on an adjacency beam rule stored at the user equipment.

Aspect 19: the computer-implemented method of any of aspects 17-18, wherein the at least one adjacent beam is further determined based on an adjacency beam rule that is received from a location server.

Aspect 20: the computer-implemented method of any of aspects 17-19, wherein the at least one adjacent beam is further determined based on an adjacency beam rule that is received from a base station.

Aspect 21: the computer-implemented method of any of aspects 17-20, wherein the PRS beam set is associated with a plurality of beams, the plurality of beams including the assigned beam and the at least one adjacent beam.

Aspect 22: the computer-implemented method of any of aspects 17-21, wherein the plurality of beams associated with the PRS beam set are sequentially ordered by adjacency in an angular domain.

Aspect 23: the computer-implemented method of any of aspects 17-22, wherein the at least one adjacent beam is physically adjacent to the assigned beam in at least one of an azimuth domain, an elevation domain, or a combination thereof Aspect 24: the computer-implemented method of any of aspects 17-23, wherein the beam index information is generated based on at least one of a transmission reception point (TRP) location, an antenna array panel location, an estimated user equipment (UE) location, or a combination thereof Aspect 25: the computer-implemented method of any of aspects 17-24, wherein the beam index information is received from a base station.

Aspect 26: the computer-implemented method of any of aspects 17-25, wherein the beam index information is received from a location server.

Aspect 27: the computer-implemented method of any of aspects 17-26, wherein the location measurement includes at least one of a downlink angle of departure, a PRS-based reference signal received power (RSRP) measurement, time of arrival of an earliest path, phase information, amplitude information, location information, or a combination thereof Aspect 28: the computer-implemented method of any of aspects 17-27, further comprising receiving updated beam index information associated with an updated PRS beam set.

Aspect 29: the computer-implemented method of any of aspects 17-28, wherein the beam index information is a PRS resource index.

Aspect 30: the computer-implemented method of any of aspects 17-29, wherein the assigned beam is based on at least one of an expected beam index, an expected PRS resource index, a reference PRS resource, or a combination thereof Aspect 31: the computer-implemented method of any of aspects 17-30, wherein determining the at least one adjacent beam comprises: determining a first adjacent beam based on the assigned beam and the beam index information, wherein the first adjacent beam is adjacent to the assigned beam; and determining a second adjacent beam based on the assigned beam and the beam index information, wherein the second adjacent beam is adjacent to the assigned beam, and wherein the first adjacent beam is different from the second adjacent beam.

Aspect 32: the computer-implemented method of any of aspects 17-31, wherein determining the at least one adjacent beam comprises: determining a third adjacent beam based on the assigned beam and the beam index information, wherein the third adjacent beam is adjacent to the first adjacent beam; and determining a fourth adjacent beam based on the assigned beam and the beam index information, wherein the fourth adjacent beam is adjacent to the second adjacent beam, and wherein the third adjacent beam is different from the fourth adjacent beam.

Aspect 33: an apparatus for facilitating positioning reference signal (PRS) prioritization, the apparatus comprising: means for receiving beam index information associated with a PRS beam set; means for determining an assigned beam, at least one adjacent beam or both based on the beam index information; and means for determining one or more location measurements based on at least one of the assigned beam, or the at least one adjacent beam, or both.

Aspect 34: the apparatus of aspect 33, wherein the at least one adjacent beam is further determined based on an adjacency beam rule stored at the apparatus.

Aspect 35: the apparatus of any of aspects 33-34, wherein the at least one adjacent beam is further determined based on an adjacency beam rule that is received from a location server.

Aspect 36: the apparatus of any of aspects 33-35, wherein the at least one adjacent beam is further determined based on an adjacency beam rule that is received from a base station.

Aspect 37: the apparatus of any of aspects 33-36, wherein the PRS beam set is associated with a plurality of beams, the plurality of beams including the assigned beam and the at least one adjacent beam.

Aspect 38: the apparatus of any of aspects 33-37, wherein the plurality of beams associated with the PRS beam set are sequentially ordered by adjacency in an angular domain.

Aspect 39: the apparatus of any of aspects 33-38, wherein the at least one adjacent beam is physically adjacent to the assigned beam in at least one of an azimuth domain, an elevation domain, or a combination thereof Aspect 40: the apparatus of any of aspects 33-39, wherein the beam index information is generated based on at least one of a transmission reception point (TRP) location, an antenna array panel location, an estimated user equipment (UE) location, or a combination thereof Aspect 41: the apparatus of any of aspects 33-40, wherein the beam index information is received from a base station.

Aspect 42: the apparatus of any of aspects 33-41, wherein the beam index information is received from a location server.

Aspect 43: the apparatus of any of aspects 33-42, wherein the location measurement includes at least one of a downlink angle of departure, a PRS-based reference signal received power (RSRP) measurement, time of arrival of an earliest path, phase information, amplitude information, location information, or a combination thereof Aspect 44: the apparatus of any of aspects 33-43, further comprising means for receiving updated beam index information associated with an updated PRS beam set.

Aspect 45: the apparatus of any of aspects 33-44, wherein the beam index information is a PRS resource index.

Aspect 46: the apparatus of any of aspects 33-45, wherein the assigned beam is based on at least one of an expected beam index, an expected PRS resource index, a reference PRS resource, or a combination thereof Aspect 47: the apparatus of any of aspects 33-46, wherein means for determining the at least one adjacent beam comprises: means for determining a first adjacent beam based on the assigned beam and the beam index information, wherein the first adjacent beam is adjacent to the assigned beam; and means for determining a second adjacent beam based on the assigned beam and the beam index information, wherein the second adjacent beam is adjacent to the assigned beam, and wherein the first adjacent beam is different from the second adjacent beam.

Aspect 48: the apparatus of any of aspects 33-47, wherein means for determining the at least one adjacent beam comprises: means for determining a third adjacent beam based on the assigned beam and the beam index information, wherein the third adjacent beam is adjacent to the first adjacent beam; and means for determining a fourth adjacent beam based on the assigned beam and the beam index information, wherein the fourth adjacent beam is adjacent to the second adjacent beam, and wherein the third adjacent beam is different from the fourth adjacent beam.

Aspect 49: a non-transitory computer-readable storage medium for facilitating positioning reference signal (PRS) prioritization comprising at least one instruction for causing a computer or processor to: receive beam index information associated with a positioning reference signal (PRS) beam set; determine an assigned beam, at least one adjacent beam or both based on the beam index information; and determine one or more location measurements based on at least one of the assigned beam, the at least one adjacent beam or both.

Aspect 50: the non-transitory computer-readable storage medium of aspect 49, wherein the at least one adjacent beam is further determined based on an adjacency beam rule stored in the storage medium.

Aspect 51: the non-transitory computer-readable storage medium of any of aspects 49-50, wherein the at least one adjacent beam is further determined based on an adjacency beam rule that is received from a location server.

Aspect 52: the non-transitory computer-readable storage medium of any of aspects 49-51, wherein the at least one adjacent beam is further determined based on an adjacency beam rule that is received from a base station.

Aspect 53: the non-transitory computer-readable storage medium of any of aspects 49-52, wherein the PRS beam set is associated with a plurality of beams, the plurality of beams including the assigned beam and the at least one adjacent beam.

Aspect 54: the non-transitory computer-readable storage medium of any of aspects 49-53, wherein the plurality of beams associated with the PRS beam set are sequentially ordered by adjacency in an angular domain.

Aspect 55: the non-transitory computer-readable storage medium of any of aspects 49-54, wherein the at least one adjacent beam is physically adjacent to the assigned beam in at least one of an azimuth domain, an elevation domain, or a combination thereof Aspect 56: the non-transitory computer-readable storage medium of any of aspects 49-55, wherein the beam index information is generated based on at least one of a transmission reception point (TRP) location, an antenna array panel location, an estimated user equipment (UE) location, or a combination thereof Aspect 57: the non-transitory computer-readable storage medium of any of aspects 49-56, wherein the beam index information is received from a base station.

Aspect 58: the non-transitory computer-readable storage medium of any of aspects 49-57, wherein the beam index information is received from a location server.

Aspect 59: the non-transitory computer-readable storage medium of any of aspects 49-58, wherein the location measurement includes at least one of a downlink angle of departure, a PRS-based reference signal received power (RSRP) measurement, time of arrival of an earliest path, phase information, amplitude information, location information, or a combination thereof Aspect 60: the non-transitory computer-readable storage medium of any of aspects 49-59, wherein the at least one instruction further causes the computer or processor to receive updated beam index information associated with an updated PRS beam set.

Aspect 61: the non-transitory computer-readable storage medium of any of aspects 49-60, wherein the beam index information is a PRS resource index.

Aspect 62: the non-transitory computer-readable storage medium of any of aspects 49-61, wherein the assigned beam is based on at least one of an expected beam index, an expected PRS resource index, a reference PRS resource, or a combination thereof Aspect 63: the non-transitory computer-readable storage medium of any of aspects 49-62, wherein, to determine the at least one adjacent beam, the at least one instruction further causes the computer or processor to: determine a first adjacent beam based on the assigned beam and the beam index information, wherein the first adjacent beam is adjacent to the assigned beam; and determine a second adjacent beam based on the assigned beam and the beam index information, wherein the second adjacent beam is adjacent to the assigned beam, and wherein the first adjacent beam is different from the second adjacent beam.

Aspect 64: the non-transitory computer-readable storage medium of any of aspects 49-63, wherein, to determine the at least one adjacent beam, the at least one instruction further causes the computer or processor to: determine a third adjacent beam based on the assigned beam and the beam index information, wherein the third adjacent beam is adjacent to the first adjacent beam; and determine a fourth adjacent beam based on the assigned beam and the beam index information, wherein the fourth adjacent beam is adjacent to the second adjacent beam, and wherein the third adjacent beam is different from the fourth adjacent beam.

What is claimed is:

1. An apparatus for facilitating positioning reference signal (PRS) prioritization, the apparatus comprising:

at least one receiver;

at least one memory; and at least one processor coupled to the at least one receiver and the at least one memory and configured to:

receive, via the at least one receiver, beam index information associated with a PRS beam set;

determine, based on the beam index information, at least one adjacent beam within the PRS beam set that is adjacent to an assigned beam within the PRS beam set; and determine one or more location measurements based on at least one of the assigned beam, the at least one adjacent beam or both.

2. The apparatus of claim 1, wherein the at least one adjacent beam is further determined based on an adjacency beam rule stored in the at least one memory.

3. The apparatus of claim 1, wherein the at least one adjacent beam is further determined based on an adjacency beam rule that is received from a location server.

4. The apparatus of claim 1, wherein the at least one adjacent beam is further determined based on an adjacency beam rule that is received from a base station.

5. The apparatus of claim 1, wherein the PRS beam set is associated with a plurality of beams, the plurality of beams including the assigned beam and the at least one adjacent beam.

6. The apparatus of claim 5, wherein the plurality of beams associated with the PRS beam set are sequentially ordered by adjacency in an angular domain.

7. The apparatus of claim 1, wherein the at least one adjacent beam is physically adjacent to the assigned beam in at least one of an azimuth domain, an elevation domain, or a combination thereof.

8. The apparatus of claim 1, wherein the beam index information is generated based on at least one of a transmission reception point (TRP) location, an antenna array panel location, an estimated user equipment (UE) location, or a combination thereof.

9. The apparatus of claim 1, wherein the beam index information is received from a base station.

10. The apparatus of claim 1, wherein the beam index information is received from a location server.

11. The apparatus of claim 1, wherein the one or more location measurements include at least one of a downlink angle of departure, a PRS-based reference signal received power (RSRP) measurement, time of arrival of an earliest path, phase information, amplitude information, location information, or a combination thereof.

12. The apparatus of claim 1, wherein the at least one processor is further configured to receive, via the at least one receiver, updated beam index information associated with an updated PRS beam set.

13. The apparatus of claim 1, wherein the beam index information is a PRS resource index.

14. The apparatus of claim 1, wherein the assigned beam is based on at least one of an expected beam index, an expected PRS resource index, a reference PRS resource, or a combination thereof.

15. The apparatus of claim 1, wherein, to determine the at least one adjacent beam, the at least one processor is further configured to:

determine a first adjacent beam based on the assigned beam and the beam index information, wherein the first adjacent beam is adjacent to the assigned beam; and determine a second adjacent beam based on the assigned beam and the beam index information, wherein the second adjacent beam is adjacent to the assigned beam, and wherein the first adjacent beam is different from the second adjacent beam.

16. The apparatus of claim 15, wherein, to determine the at least one adjacent beam, the at least one processor is further configured to:

determine a third adjacent beam based on the assigned beam and the beam index information, wherein the third adjacent beam is adjacent to the first adjacent beam; and determine a fourth adjacent beam based on the assigned beam and the beam index information, wherein the fourth adjacent beam is adjacent to the second adjacent beam, and wherein the third adjacent beam is different from the fourth adjacent beam.

17. The apparatus of claim 1, wherein the at least one adjacent beam is further determined based on an adjacency beam rule comprising a priority order.

18. A computer-implemented method for facilitating positioning reference signal (PRS) prioritization, the computer-implemented method comprising:

receiving, at a user equipment, beam index information associated with a PRS beam set;

determining, by the user equipment, based on the beam index information, at least one adjacent beam within the PRS beam set that is adjacent to an assigned beam within the PRS beam set; and determining, by the user equipment, one or more location measurements based on the assigned beam, the at least one adjacent beam or both.

19. The computer-implemented method of claim 18, wherein the at least one adjacent beam is further determined based on an adjacency beam rule stored at the user equipment.

20. The computer-implemented method of claim 18, wherein the at least one adjacent beam is further determined based on an adjacency beam rule that is received from a location server.

21. The computer-implemented method of claim 18, wherein the at least one adjacent beam is further determined based on an adjacency beam rule that is received from a base station.

22. The computer-implemented method of claim 18, wherein the PRS beam set is associated with a plurality of beams, the plurality of beams including the assigned beam and the at least one adjacent beam.

23. The computer-implemented method of claim 22, wherein the plurality of beams associated with the PRS beam set are sequentially ordered by adjacency in an angular domain.

24. The computer-implemented method of claim 18, wherein the at least one adjacent beam is physically adjacent to the assigned beam in at least one of an azimuth domain, an elevation domain, or a combination thereof.

25. The computer-implemented method of claim 18, wherein the beam index information is generated based on at least one of a transmission reception point (TRP) location, an antenna array panel location, an estimated user equipment (UE) location, or a combination thereof.

26. The computer-implemented method of claim 18, wherein the beam index information is received from a base station.

27. The computer-implemented method of claim 18, wherein the beam index information is received from a location server.

28. The computer-implemented method of claim 18, wherein the one or more location measurements include at least one of a downlink angle of departure, a PRS-based reference signal received power (RSRP) measurement, time of arrival of an earliest path, phase information, amplitude information, location information, or a combination thereof.

29. The computer-implemented method of claim 18, further comprising receiving updated beam index information associated with an updated PRS beam set.

30. The computer-implemented method of claim 18, wherein the beam index information is a PRS resource index.

31. The computer-implemented method of claim 18, wherein the assigned beam is based on at least one of an expected beam index, an expected PRS resource index, a reference PRS resource, or a combination thereof.

32. The computer-implemented method of claim 18, wherein determining the at least one adjacent beam comprises:

determining a first adjacent beam based on the assigned beam and the beam index information, wherein the first adjacent beam is adjacent to the assigned beam; and determining a second adjacent beam based on the assigned beam and the beam index information, wherein the second adjacent beam is adjacent to the assigned beam, and wherein the first adjacent beam is different from the second adjacent beam.

33. The computer-implemented method of claim 32, wherein determining the at least one adjacent beam comprises:

determining a third adjacent beam based on the assigned beam and the beam index information, wherein the third adjacent beam is adjacent to the first adjacent beam; and determining a fourth adjacent beam based on the assigned beam and the beam index information, wherein the fourth adjacent beam is adjacent to the second adjacent beam, and wherein the third adjacent beam is different from the fourth adjacent beam.

34. An apparatus for facilitating positioning reference signal (PRS) prioritization, the apparatus comprising:

means for receiving beam index information associated with a PRS beam set;

means for determining, based on the beam index information, at least one adjacent beam within the PRS beam set that is adjacent to an assigned beam within the PRS beam set; and means for determining one or more location measurements based on the assigned beam, the at least one adjacent beam or both.

35. The apparatus of claim 34, wherein the at least one adjacent beam is further determined based on an adjacency beam rule stored at the apparatus.

36. The apparatus of claim 34, wherein the at least one adjacent beam is further determined based on an adjacency beam rule that is received from a location server.

37. The apparatus of claim 34, wherein the at least one adjacent beam is further determined based on an adjacency beam rule that is received from a base station.

38. The apparatus of claim 34, wherein the PRS beam set is associated with a plurality of beams, the plurality of beams including the assigned beam and the at least one adjacent beam.

39. The apparatus of claim 38, wherein the plurality of beams associated with the PRS beam set are sequentially ordered by adjacency in an angular domain.

40. The apparatus of claim 34, wherein the at least one adjacent beam is physically adjacent to the assigned beam in at least one of an azimuth domain, an elevation domain, or a combination thereof.

41. The apparatus of claim 34, wherein the beam index information is generated based on at least one of a transmission reception point (TRP) location, an antenna array panel location, an estimated user equipment (UE) location, or a combination thereof.

42. The apparatus of claim 34, wherein the beam index information is received from a base station.

43. The apparatus of claim 34, wherein the beam index information is received from a location server.

44. The apparatus of claim 34, wherein the one or more location measurements include at least one of a downlink angle of departure, a PRS-based reference signal received power (RSRP) measurement, time of arrival of an earliest path, phase information, amplitude information, location information, or a combination thereof.

45. The apparatus of claim 34, further comprising means for receiving updated beam index information associated with an updated PRS beam set.

46. The apparatus of claim 34, wherein the beam index information is a PRS resource index.

47. The apparatus of claim 34, wherein the assigned beam is based on at least one of an expected beam index, an expected PRS resource index, a reference PRS resource, or a combination thereof.

48. The apparatus of claim 34, wherein means for determining the at least one adjacent beam comprises:

means for determining a first adjacent beam based on the assigned beam and the beam index information, wherein the first adjacent beam is adjacent to the assigned beam; and means for determining a second adjacent beam based on the assigned beam and the beam index information, wherein the second adjacent beam is adjacent to the assigned beam, and wherein the first adjacent beam is different from the second adjacent beam.

49. The apparatus of claim 48, wherein means for determining the at least one adjacent beam comprises:

means for determining a third adjacent beam based on the assigned beam and the beam index information, wherein the third adjacent beam is adjacent to the first adjacent beam; and means for determining a fourth adjacent beam based on the assigned beam and the beam index information, wherein the fourth adjacent beam is adjacent to the second adjacent beam, and wherein the third adjacent beam is different from the fourth adjacent beam.

50. A non-transitory computer-readable storage medium comprising at least one instruction for causing a computer or processor to:

receive beam index information associated with a positioning reference signal (PRS) beam set;

determine, based on the beam index information, at least one adjacent beam within the PRS beam set that is adjacent to an assigned beam within the PRS beam set; and determine one or more location measurements based on the assigned beam, the at least one adjacent beam or both.

51. The non-transitory computer-readable storage medium of claim 50, wherein the at least one adjacent beam is further determined based on an adjacency beam rule stored in the non-transitory computer-readable storage medium.

52. The non-transitory computer-readable storage medium of claim 50, wherein the at least one adjacent beam is further determined based on an adjacency beam rule that is received from a location server.

53. The non-transitory computer-readable storage medium of claim 50, wherein the at least one adjacent beam is further determined based on an adjacency beam rule that is received from a base station.

54. The non-transitory computer-readable storage medium of claim 50, wherein the PRS beam set is associated with a plurality of beams, the plurality of beams including the assigned beam and the at least one adjacent beam.

55. The non-transitory computer-readable storage medium of claim 54, wherein the plurality of beams associated with the PRS beam set are sequentially ordered by adjacency in an angular domain.

56. The non-transitory computer-readable storage medium of claim 50, wherein the at least one adjacent beam is physically adjacent to the assigned beam in at least one of an azimuth domain, an elevation domain, or a combination thereof.

57. The non-transitory computer-readable storage medium of claim 50, wherein the beam index information is generated based on at least one of a transmission reception point (TRP) location, an antenna array panel location, an estimated user equipment (UE) location, or a combination thereof.

58. The non-transitory computer-readable storage medium of claim 50, wherein the beam index information is received from a base station.

59. The non-transitory computer-readable storage medium of claim 50, wherein the beam index information is received from a location server.

60. The non-transitory computer-readable storage medium of claim 50, wherein the one or more location measurements include at least one of a downlink angle of departure, a PRS-based reference signal received power (RSRP) measurement, time of arrival of an earliest path, phase information, amplitude information, location information, or a combination thereof.

61. The non-transitory computer-readable storage medium of claim 50, wherein the at least one instruction further causes the computer or processor to receive updated beam index information associated with an updated PRS beam set.

62. The non-transitory computer-readable storage medium of claim 50, wherein the beam index information is a PRS resource index.

63. The non-transitory computer-readable storage medium of claim 50, wherein, to determine the at least one adjacent beam, the at least one instruction further causes the computer or processor to:

determine a first adjacent beam based on the assigned beam and the beam index information, wherein the first adjacent beam is adjacent to the assigned beam; and determine a second adjacent beam based on the assigned beam and the beam index information, wherein the second adjacent beam is adjacent to the assigned beam, and wherein the first adjacent beam is different from the second adjacent beam.

64. The non-transitory computer-readable storage medium of claim 63, wherein, to determine the at least one adjacent beam, the at least one instruction further causes the computer or processor to:

determine a third adjacent beam based on the assigned beam and the beam index information, wherein the third adjacent beam is adjacent to the first adjacent beam; and determine a fourth adjacent beam based on the assigned beam and the beam index information, wherein the fourth adjacent beam is adjacent to the second adjacent beam, and wherein the third adjacent beam is different from the fourth adjacent beam.

* * * * *